(12) United States Patent
He et al.

(10) Patent No.: US 9,477,654 B2
(45) Date of Patent: Oct. 25, 2016

(54) CONVOLUTIONAL LATENT SEMANTIC MODELS AND THEIR APPLICATIONS

(71) Applicant: Microsoft Corporation, Redmond, WA (US)

(72) Inventors: Xiaodong He, Issaquah, WA (US); Jianfeng Gao, Woodinville, WA (US); Li Deng, Redmond, WA (US); Qiang Lou, Bellevue, WA (US); Yunhong Zhou, Bellevue, WA (US); Guowei Liu, Sammamish, WA (US); Gregory T. Buehrer, Issaquah, WA (US); Jianchang Mao, Bellevue, WA (US); Yelong Shen, Redmond, WA (US); Ruofei Zhang, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 280 days.

(21) Appl. No.: 14/242,845

(22) Filed: Apr. 1, 2014

(65) Prior Publication Data
US 2015/0278200 A1    Oct. 1, 2015

(51) Int. Cl.
| | |
|---|---|
| *G06F 17/30* | (2006.01) |
| *G06F 7/00* | (2006.01) |
| *G06F 17/27* | (2006.01) |
| *G06F 17/22* | (2006.01) |

(52) U.S. Cl.
CPC ....... *G06F 17/2785* (2013.01); *G06F 17/2211* (2013.01)

(58) Field of Classification Search
USPC ........................................................ 707/749
See application file for complete search history.

(56) References Cited

U.S. PATENT DOCUMENTS

| | | |
|---|---|---|
| 6,701,318 B2 | 3/2004 | Fox et al. |
| 7,685,084 B2 | 3/2010 | Sisk et al. |
| 7,716,216 B1 | 5/2010 | Harik et al. |

(Continued)

FOREIGN PATENT DOCUMENTS

WO    2013121181 A1    8/2013

OTHER PUBLICATIONS

Wang, et al., "Explore Click Models for Search Ranking," In Proceedings of the 19th ACM International Conference on Information and Knowledge Management, Oct. 2010, 4 pages.

(Continued)

*Primary Examiner* — Kuen Lu
(74) *Attorney, Agent, or Firm* — Steven Spellman; Tom Wong; Micky Minhas

(57) ABSTRACT

Functionality is described herein for transforming first and second symbolic linguistic items into respective first and second continuous-valued concept vectors, using a deep learning model, such as a convolutional latent semantic model. The model is designed to capture both the local and global linguistic contexts of the linguistic items. The functionality then compares the first concept vector with the second concept vector to produce a similarity measure. More specifically, the similarity measure expresses the closeness between the first and second linguistic items in a high-level semantic space. In one case, the first linguistic item corresponds to a query, and the second linguistic item may correspond to a phrase, or a document, or a keyword, or an ad, etc. In one implementation, the convolutional latent semantic model is produced in a training phase based on click-through data.

20 Claims, 12 Drawing Sheets

(56) References Cited

U.S. PATENT DOCUMENTS

| | | | |
|---|---|---|---|
| 7,840,569 | B2 | 11/2010 | Meyerzon et al. |
| 8,055,669 | B1* | 11/2011 | Singhal .............. G06F 17/3064 707/765 |
| 8,229,948 | B1 | 7/2012 | Ershov |
| 8,266,144 | B2 | 9/2012 | Tankovich et al. |
| 8,359,282 | B2 | 1/2013 | Bai et al. |
| 8,392,436 | B2 | 3/2013 | Bai et al. |
| 8,504,361 | B2 | 8/2013 | Collobert et al. |
| 8,751,238 | B2* | 6/2014 | James ................... G10L 13/033 704/260 |
| 8,775,442 | B2* | 7/2014 | Moore .............. G06F 17/30011 707/724 |
| 2005/0004905 | A1 | 1/2005 | Dresden |
| 2006/0026013 | A1 | 2/2006 | Kraft |
| 2006/0277033 | A1 | 12/2006 | Gao et al. |
| 2007/0124263 | A1 | 5/2007 | Katariya et al. |
| 2007/0136281 | A1 | 6/2007 | Li et al. |
| 2007/0203869 | A1 | 8/2007 | Ramsey et al. |
| 2008/0243820 | A1 | 10/2008 | Chang et al. |
| 2009/0125501 | A1 | 5/2009 | Gao et al. |
| 2009/0259651 | A1 | 10/2009 | Tankovich et al. |
| 2009/0276414 | A1 | 11/2009 | Gao et al. |
| 2010/0153315 | A1 | 6/2010 | Gao et al. |
| 2010/0250547 | A1 | 9/2010 | Grefenstette et al. |
| 2010/0318531 | A1 | 12/2010 | Gao et al. |
| 2011/0208709 | A1 | 8/2011 | Holthausen |
| 2011/0208735 | A1 | 8/2011 | Gao et al. |
| 2011/0270604 | A1 | 11/2011 | Qi et al. |
| 2011/0276390 | A1 | 11/2011 | Li et al. |
| 2012/0036015 | A1 | 2/2012 | Sheikh |
| 2012/0158621 | A1 | 6/2012 | Bennett et al. |
| 2012/0253792 | A1* | 10/2012 | Bespalov .......... G06F 17/30707 704/9 |
| 2012/0254217 | A1 | 10/2012 | Ali et al. |
| 2012/0254218 | A1 | 10/2012 | Ali et al. |
| 2013/0103493 | A1 | 4/2013 | Gao et al. |
| 2013/0124492 | A1 | 5/2013 | Gao et al. |
| 2013/0159320 | A1 | 6/2013 | Gao et al. |
| 2013/0239006 | A1 | 9/2013 | Tolkachev |

OTHER PUBLICATIONS

"Researchers predict click-through behavior in Web searches," retrieved at <<http://news.psu.edu/story/178742/2009/03/11/researchers-predict-click-through-behavior-web-searches>>, In Penn State News, Mar. 11, 2009, 2 pages.

Bengio, Yoshua, "Learning Deep Architectures for AI," In Foundations and Trends in Machine Learning, vol. 2, Issue 1, 2009, 130 pages.

Blei, et al., "Latent Dirichlet Allocation," In Journal of Machine Learning Research, vol. 3, Mar. 2003, 30 pages.

Brown, et al., "The Mathematics of Statistical Machine Translation: Parameter Estimation," In Computational Linguistics, vol. 19, Issue 2, Jun. 1993, 50 pages.

Burges, et al., "Learning to Rank using Gradient Descent," In Proceedings of the 22nd International Conference on Machine Learning, 2005, 8 pages.

Collobert, et al., "Natural Language Processing (Almost) from Scratch," In the Journal of Machine Learning Research, vol. 12, Feb. 2011, 45 pages.

Dahl, et al., "Context-Dependent Pre-Trained Deep Neural Networks for Large-Vocabulary Speech Recognition," In IEEE Transactions on Audio, Speech, and Language Processing, vol. 20, Issue 1, Jan. 2012, 13 pages.

Deerwester, et al., "Indexing by Latent Semantic Analysis," In Journal of the American Society for Information Science, vol. 41, Issue 6, Sep. 1990, 34 pages.

Dumais, et al., "Automatic Cross-Linguistic Retrieval Using Latent Semantic Indexing," In Proceedings of AAAI Spring Symposium Series: Cross-Language Text and Speech Retrieval, Mar. 1997, 7 pages.

Gao, et al., "Clickthrough-Based Translation Models for Web Search: from Word Models to Phrase Models," In Proceedings of the 19th ACM International Conference on Information and Knowledge Management, Oct. 2010, 10 pages.

Gao, et al., "Clickthrough-Based Latent Semantic Models for Web Search," In Proceedings of the 34th International ACM SIGIR Conference on Research and Development in Information Retrieval, Jul. 2011, 10 pages.

Gao, et al., "Smoothing Clickthrough Data for Web Search Ranking," In Proceedings of the 32nd International ACM SIGIR Conference on Research and Development in Information Retrieval, Jul. 2009, 8 pages.

Girolami, et al., "On an Equivalence between PLSI and LDA," In Proceedings of the 26th Annual International ACM SIGIR Conference on Research and Development in Information Retrieval, Jul. 2003, 3 pages.

Hinton, et al., "Deep Neural Networks for Acoustic Modeling in Speech Recognition," In Magazine of IEEE Signal Processing, Nov. 2012, 16 pages.

Hinton, et al., "Discovering Binary Codes for Documents by Learning Deep Generative Models," In Proceedings of Topics in Cognitive Science, 2010, 18 pages.

Hofmann, Thomas, "Probabilistic Latent Semantic Indexing," In Proceedings of the 22nd Annual International ACM SIGIR Conference on Research and Development in Information Retrieval, Aug. 1999, 8 pages.

Jarvelin, et al., "IR Evaluation Methods for Retrieving Highly Relevant Documents," In Proceedings of the 23rd Annual International ACM SIGIR Conference on Research and Development in Information Retrieval, Jul. 2000, 8 pages.

Li, et al., "Very Sparse Random Projections," In Proceedings of the 12th ACM SIGKDD International Conference on Knowledge Discovery and Data Mining, Aug. 20, 2006, 10 pages.

Platt, et al., "Translingual Document Representations from Discriminative Projections," In Proceedings of the Conference on Empirical Methods in Natural Language Processing, Oct. 2010, 11 pages.

Salakhutdinov, et al., "Semantic Hashing," In IRGM Workshop at the SIGIR Conference, Jun. 2007, 8 pages.

Socher, et al., "Semantic Compositionality through Recursive Matrix-Vector Spaces," In Proceedings of the Joint Conference on Empirical Methods in Natural Language Processing and Computational Natural Language Learning, Jul. 2012, 11 pages.

Svore, et al., "A Machine Learning Approach for Improved BM25 Retrieval," In Proceedings of the 18th ACM Conference on Information and Knowledge Management, Nov. 2009, 4 pages.

Wei, et al., "LDA-based Document Models for Ad-hoc Retrieval," In Proceedings of the 29th Annual International ACM SIGIR Conference on Research and Development in Information Retrieval, Aug. 2006, 8 pages.

Yih, et al., "Learning Discriminative Projections for Text Similarity Measures," In Proceedings of the Fifteenth Conference on Computational Natural Language Learning, Jun. 2011, 10 pages.

Zeiler, et al., "Adaptive Deconvolutional Networks for Mid and High Level Feature Learning," In IEEE International Conference on Computer Vision, Nov. 2011, 8 pages.

Konig, et al., "Nonlinear Discriminant Feature Extraction for Robust Text-Independent Speaker Recognition," In Proceedings of the RLA2C, 1998, 4 pages.

Heck, et al., "Robustness to telephone handset distortion in speaker recognition by discriminative feature design," In Speech Communication, vol. 31, Elsevier Science B.V., 2000, 12 pages.

Diamantaras, K. I., Principal Component Neural Networks: Theory and Applications, Wiley-Interscience publishers, 1st Edition, Mar. 1996, Amazon.com product page only, retrieved at <<http://www.amazon.com/Principal-Component-Neural-Networks-Communications/dp/0471054364>>, retrieved on Aug. 8, 2013, 4 pages.

Neural Networks: Tricks of the Trade, Springer publishers, Montavon, et al. (Eds.), 2nd Edition, Nov. 2012, Amazon.com product page only, retrieved at <<http://www.amazon.com/Neural-Networks-Lecture-Computer-Theoretical/dp/364235288X>>, retrieved on Aug. 8, 2013, 4 pages.

(56) References Cited

OTHER PUBLICATIONS

Song, et al., "Adapting Deep RankNet for Personalized Search," In Proceedings of the 7th ACM International Conference on Web Search and Data Mining, Feb. 24, 2014, 10 pages.
Chen, et al., "Small-Footprint Keyword Spotting Using Deep Neural Networks," available at <<http://old-site.clsp.jhu.edu/~guoguo/papers/chen2014small.pdf>>, accessed on Mar. 3, 2014, 5 pages.
Volkovs, Maksims N., "Context Models for Web Search Personalization," available at <<http://www.cs.toronto.edu/~mvolkovs/yandex_kaggle_model.pdf>>, accessed on Mar. 3, 2014, 7 pages.
Berger, et al., "Information Retrieval as Statistical Translation," In Proceedings of the 22nd Annual International ACM SIGIR Conference on Research and Development in Information Retrieval, 1999, 8 pages.
Deng, et al., "A Deep Convolutional Neural Network Using Heterogeneous Pooling for Trading Acoustic Invariance with Phonetic Confusion," In Proceedings of IEEE International Conference on Acoustics, Speech, and Signal Processing, May 2013, 5 pages.
Gao, "Dependence Language Model for Information Retrieval," In Proceedings of the 27th Annual International ACM SIGIR Conference on Research and Development in Information Retrieval, 2004, 8 pages.
He, et al., "Discriminative Learning in Sequential Pattern Recognition," In Proceedings of IEEE Signal Processing Magazine, vol. 25, Issue 5, 2008, 23 pages.
Huang, et al., "Learning Deep Structured Semantic Models for Web Search using Clickthrough Data," In Proceedings of the 22nd ACM International Conference on Information & Knowledge Management, Oct. 27, 2013, 6 pages.
Lu, et al., "A Deep Architecture for Matching Short Texts," In Proceedings of Advances in Neural Information Processing Systems, Dec. 2013, 9 pages.
Metzler, et al., "A Markov Random Field Model for Term Dependencies," In Proceedings of the 28th Annual International ACM SIGIR Conference on Research and Development in Information Retrieval, 2005, 8 pages.
Mikolov, et al., "Linguistic Regularities in Continuous Space Word Representations," In Proceedings of the 2013 Conference of the North American Chapter of the Association for Computational Linguistics: Human Language Technologies, May 2013, 6 pages.
Mikolov, et al., "Distributed Representations of Words and Phrases and their Compositionality," In Proceedings of Advances in Neural Information Processing Systems, Oct. 16, 2013, 9 pages.
Socher, et al., "Semantic Compositionality through Recursive Matrix-Vector Spaces," In Proceedings of the 2012 Joint Conference on Empirical Methods in Natural Language Processing and Computational Natural Language Learning, Jul. 2012, 11 pages.
Song, et al., "A General Language Model for Information Retrieval," In Proceedings of the Eighth International Conference on Information and Knowledge Management, 1999, 6 pages.
Jones, Karen Sparck, "What is the Role of NLP in Text Retrieval?," In Proceedings of Natural Language Information Retrieval Text, 1999, 19 pages.
Tur, et al., "Towards Deeper Understanding: Deep Convex Networks for Semantic Utterance Classification," In Proceedings of IEEE International Conference on Acoustics, Speech, and Signal Processing, Mar. 2012, 4 pages.
Wang, et al., "Multi-Style Language Model for Web Scale Information Retrieval," In Proceedings of the 33rd International ACM SIGIR Conference on Research and Development in Information Retrieval, 2010, 8 pages.
Zhai, et al., "A Study of Smoothing Methods for Language Models Applied to Ad Hoc Information Retrieval," In Proceedings of the 24th Annual International ACM SIGIR Conference on Research and Development in Information Retrieval, 2001, 9 pages.
Mesnil, et al., "Investigation of Recurrent-Neural-Network Architectures and Learning Methods for Spoken Language Understanding," In Proceedings of 14th Annual Conference of the International Speech Communication Association, Aug. 25, 2013, 5 pages.
Wang, et al., "Topical N-Grams: Phrase and Topic Discovery, with an Application to Information Retrieval," In Proceedings of the Seventh IEEE International Conference on Data Mining, 2007, 6 pages.
Maas, eta l., "A Probabilistic Model for Semantic Word Vectors," In NIPS Workshop on Deep Learning and Unsupervised Feature Learning, 2010, 8 pages.
Yih, et al., "Learning Discriminative Projections for Text Similarity Measures," In Proceedings of the Fifteenth Conference on Computational Natural Language Learning, 2011, 10 pages.
Huang, et al., "A Deep Structured Semantic Model Produced Using Click-Through Data," U.S. Appl. No. 14/019,563, filed Sep. 6, 2013, 54 pages.
Guo, et al., "Context-Sensitive Search Using a Deep Learning Model," U.S. Appl. No. 14/252,703, filed Apr. 14, 2014, 58 pages.
PCT Search Report and Written Opinion for PCT/US2015/024417, mailed on Jun. 18, 2015, 10 pages.

\* cited by examiner

CONVOLUTIONAL LATENT SEMANTIC MODELS AND THEIR APPLICATIONS

BACKGROUND

A traditional technique for comparing a first linguistic item (such as a query) with a second linguistic item (such as a document) is to directly compare terms in the first linguistic item with the terms in the second linguistic item. In some cases, however, the two linguistic items may use different words to express the same concept. The traditional technique may produce unsatisfactory results in these circumstances.

To address the above drawbacks, the research community has proposed techniques which project linguistic items to a higher-level semantic space, and then compare the linguistic items in that space, rather than (or in addition to) comparing the lexical "surface" forms of the linguistic items. For example, a technique may use the well-known Latent Semantic Analysis (LSA) technique to perform the above-described kind of processing.

The above-described types of latent analysis techniques have, in some cases, improved the quality of linguistic analysis. Yet there remains room for further improvement in this field of research. For instance, known latent analysis techniques often produce unsatisfactory results in those cases in which linguistic items use similar words, but in different respective contexts.

SUMMARY

Functionality is described herein for transforming at least a first linguistic item into a first concept vector, and a second linguistic item into a second concept vector, using a deep learning model. For instance, the deep learning model may correspond to a convolutional latent semantic model. The functionality then compares the first concept vector with the second concept vector to produce a similarity measure. More specifically, the similarity measure expresses the similarity between the first and second linguistic items in a high-level semantic space. The deep learning model is specifically designed to accurately represent the local context in which words are expressed in the linguistic items. The model also accurately captures the global meaning of the linguistic items.

In one case, the first linguistic item corresponds to a query, and the second linguistic item corresponds to a document. In another case, the first linguistic item corresponds to a query, and the second linguistic item corresponds to a keyword, for use in conjunction with an advertising system. In another case, the first linguistic item corresponds to a query, and the second linguistic item corresponds to an ad, and so on. Still other applications of the functionality are possible.

In one case, the convolutional latent semantic model corresponds to a model that is implemented by a convolutional neural network.

In one case, the convolutional latent semantic model is produced based on click-through data. More specifically, the convolutional latent semantic model is produced by maximizing a conditional likelihood of clicked documents (or keywords pertaining to clicked ads, etc.), given a specified query.

The above approach can be manifested in various types of systems, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an analysis engine that uses a deep learning model to project linguistic items into a high-level semantic space, and then compare those items in that space. Section B sets forth one manner of operation of the analysis engine. Section C describes illustrative computing functionality that can be used to implement any aspect of the features described the preceding sections.

Figure 14:
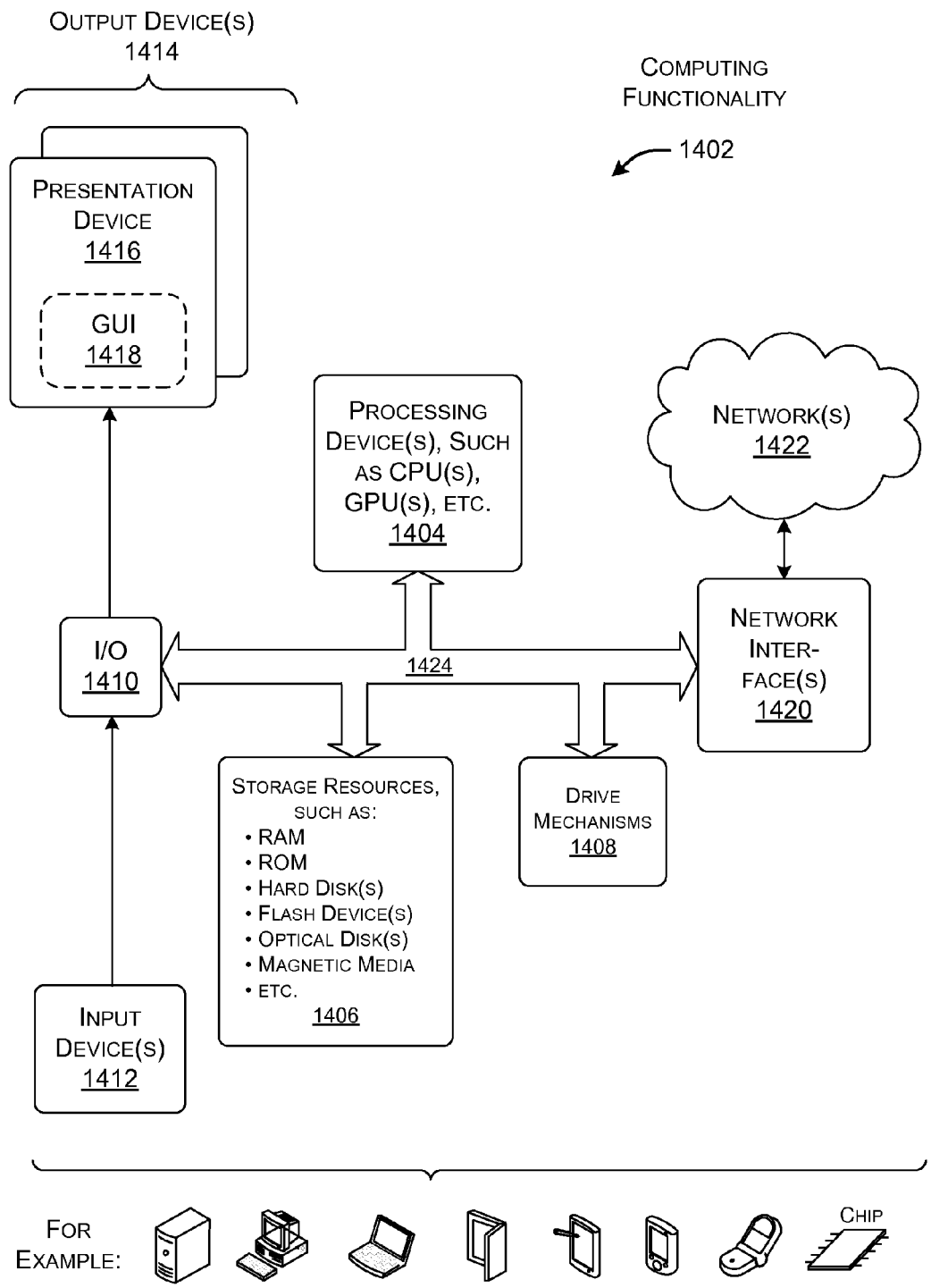
FIG. 14 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 14, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Further, any description of a single entity is not intended to preclude the use of plural such entities; similarly, a description of plural entities is not intended to preclude the use of a single entity. Finally, the terms "exemplary" or "illustrative" refer to one implementation among potentially many implementations.

A. Illustrative Environment

A.1. Overview

Figure 1:
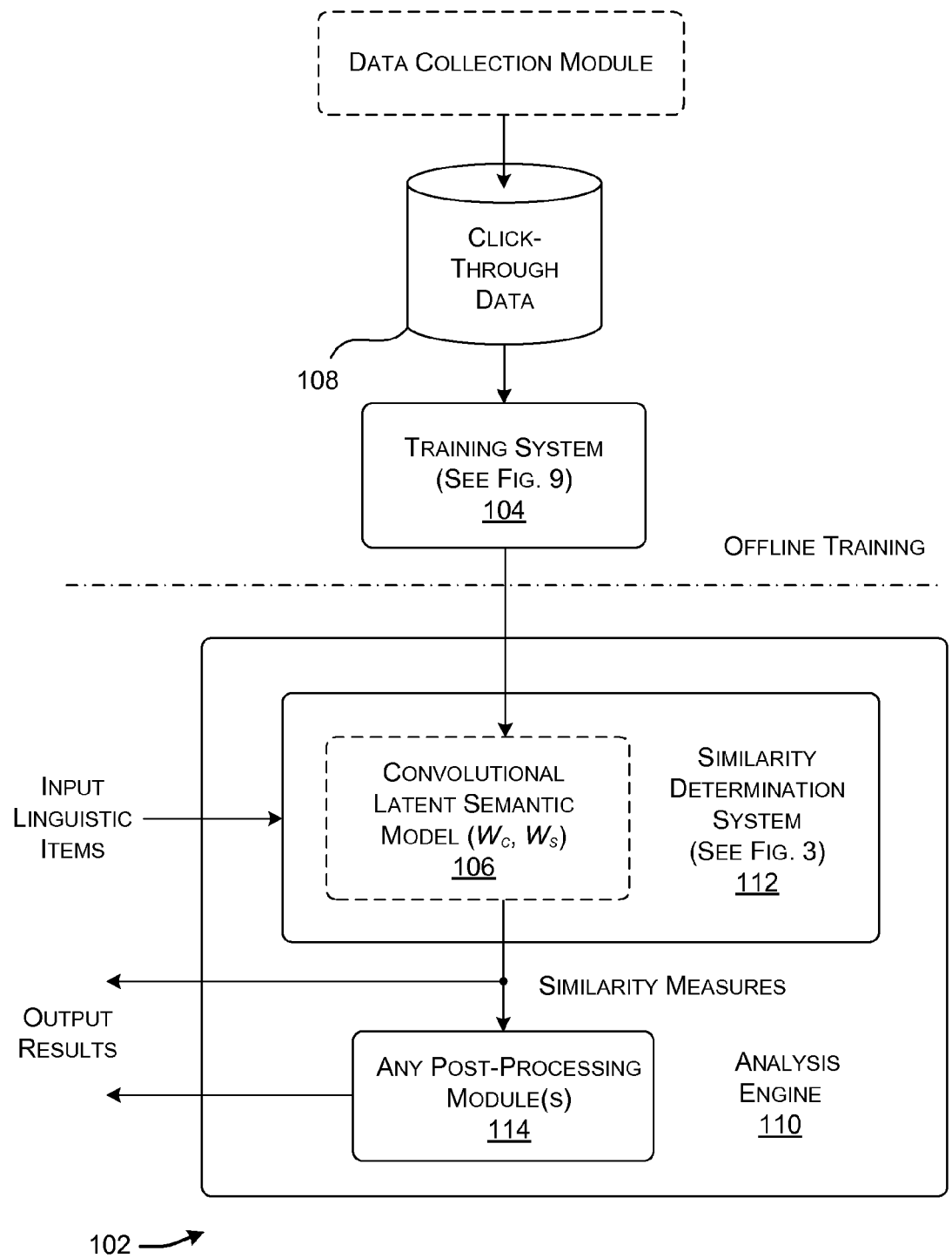
FIG. 1 shows an illustrative environment in which an analysis engine processes linguistic items using a deep learning model, such as a convolutional latent semantic model.

FIG. 1 shows an environment 102 that includes a training system 104 for producing a convolutional latent semantic model 106 (henceforth, simply "model" 106). The training system 104 produces the model 106 based on click-through data maintained in a data store 108. In one context, as will be explained in greater detail below, the training system 104 produces the model 106 such that a conditional likelihood of clicked documents, given respective queries, is maximized, and the conditional likelihood of non-clicked documents, for the respective queries, is reduced. In other cases, the behavior of the user is gauged with respect to keywords that are associated with clicked ads. Subsection A.4 (below) provides further details regarding the operation of the training system 104.

As a general characteristic, the model 106 extracts latent semantic information from each linguistic item. The extracted information may not be evident based on an inspection of the lexical surface form of the linguistic item. In this sense, the convolutional latent semantic model may also be characterized as a type of deep learning model.

In one implementation, the model 106 is implemented as a convolutional neural network having a plurality of layers. Further, in one particular implementation, the model 106 may be principally defined by at least two matrices, $W_C$ and $W_S$. The matrix $W_C$, referred to as the convolution matrix, is used in performing a convolution operation (to be described below). The matrix $W_S$, referred to as the semantic projection matrix, is used to perform a semantic projection operation (also described below).

As used herein, the term "linguistic item" corresponds to information expressed in any natural language or other symbolic framework, composed of a sequence of one or more words or other symbols. A "vector," as that term is used herein, broadly corresponds to any information having two or more elements, associated with respective vector dimensions. For example, a vocabulary that has 10,000 unique words may allocate a dimension, and a corresponding value, to each word.

An analysis engine 110 applies the model 106. FIG. 1 represents the operation of the analysis engine 110 from a generic point of view, applicable to different application environments. Subsection A.3 (below) provides additional information regarding the use of the analysis engine 110 in different application environments, such as a document retrieval environment, a keyword selection environment, an ad selection environment, and so on.

The analysis engine 110 includes a similarity determination system 112 and, optionally, any post-processing module or modules 114 (referred to in the singular below). The similarity determination system 112 receives any number of linguistic items, and performs analysis on these linguistic items. The similarity determination system 112, however, will be explained with respect to the simplified case in which the similarity determination system 112 receives at least a first linguistic item and a second linguistic item. The similarity determination system 112 then uses the model 106 to transform the first and second linguistic items into respective first and second concept vectors, expressed in a high-level semantic space. Each concept vector describes the meaning of its corresponding linguistic item, which may not be apparent based on the lexical surface form of the linguistic item. In one case, the similarity determination system 112 can perform its transformation of linguistic items in a dynamic manner, that is, in response to the receipt of the linguistic item(s). Alternatively, or in addition, the similarity determination system 112 can perform its transformation in an offline basis, e.g., prior to the receipt of the linguistic item(s).

The similarity determination system 112 can then compare the first concept vector with the second concept vector, to generate a similarity measure. The similarity measure describes the degree of similarity (e.g., closeness) between the first linguistic item and the second linguistic item. That is, two concept vectors that are close together in the high-level semantic space correspond to linguistic items that express similar meanings. Subsection A.2 (below) provides additional information regarding the operation of the similarity determination system 112.

For example, in one case, the first linguistic item is a query, composed of one or more words. The second linguistic item is a document, likewise composed of one or more words. The similarity determination system 112 can convert the query into a query concept vector, and convert the document to a document concept vector. (Note that the similarity determination system 112 can optionally convert the document into the document concept vector as part of an offline process, prior to the receipt of the query.) The similarity determination system 112 can then compare the query concept vector with the document concept vector to determine how semantically similar the query is to the document. (More generally stated, the similarity determination system 112 can perform the above-described operation with respect to a plurality of documents, not just a single document.)

In another case, the first linguistic item is a first document, composed of one or more words. The second linguistic item is a second document, composed of one or more words. The similarity determination system 112 can convert the first document to a first document concept vector, and convert the second document to a second document concept vector. The similarity determination system 112 can perform these conversions in an online and/or offline manner, depending on the nature of different application environments. The similarity determination system 112 can then compare the first document concept vector with the second document concept vector to determine how semantically similar the two documents are to each other. More specifically, the similarity determination system 112 can perform this operation with respect to a plurality of documents, to identify respective clusters of semantically similar documents.

In another case, the first linguistic item is again a query, composed of one or more words. The second linguistic item is an ad-related keyword that is likewise composed of one or more words. The similarity determination system 112 can convert the query to a query concept vector, and convert the keyword to a keyword-related concept vector. The similarity determination system 112 can then compare the query concept vector to the keyword-related concept vector to determine how semantically similar the query is to the ad-related keyword.

In yet another case, the first linguistic item is again a query, composed of one or more words. The second linguistic item is an actual ad that is likewise composed of one or more words. Or the ad may have different types of media content, of which at least a portion includes one or more words. The similarity determination system 112 can convert the query to a query concept vector, and convert the ad to an ad concept vector. The similarity determination system 112 can then compare the query concept vector with the ad concept vector to determine how semantically similar the query is to the ad.

In yet another case, the first linguistic item is a first part of an ad, and the second linguistic item is a second part of the same ad. For example, the first part of the ad may correspond to its title, and the second part of the ad may correspond to its keyword, or its body (i.e., its content), etc. The similarity determination system 112 can convert the first part of the ad to a first item-part concept vector and the second part of the ad to a second item-part concept vector. The similarity determination system 112 can then compare the concept vectors to determine their closeness in the semantic space. The resultant similarity measure may, in some cases, correlate to the quality of the ad. For example, consider an ad having content which is not semantically related to its keyword, as when the body of the ad relates to the topic of fishing, while the keyword relates to tax preparation. Such an ad will have a low similarity measure, which may be interpreted as a low quality measure. As will be described in Subsection A.3 (below), a ranking or filtering module may choose to discount or ignore such an ad. For example, if the user inputs a query that pertains to tax preparation, a ranking or filtering module may choose to discount or ignore the ad because it has a low quality measure, irrespective of the fact that its keyword may seem to relate to the topic of tax preparation (and hence, the query-to-keyword similarity score may be high). Such a quality measure can be computed based on a consideration of any number of ad parts, including more than two ad parts.

As a further note, the representative examples described herein are based on the simplifying assumption that the first and second linguistic items express information in the same natural language, such as English. But in other applications, the first linguistic item may express information in a first natural language (such as English), and the second linguistic item may express information in a second natural language (such as Spanish). In that context, a machine translation system may use the analysis engine 110 to identify items across different natural languages that express the same underlying concept. Further, the analysis engine 110 can also be applied to items that express information in other symbolic frameworks, not necessarily natural languages.

The above-described applications of the similarity determination system 112 are cited by way of example, not limitation. More generally stated, the similarity determination system 112 can be used to facilitate the comparison of any two or more instances of linguistic information. Further, the similarity determination system 112 can be used in an online context and/or an offline context. In one online context, the similarity determination system 112 is triggered when end users submit queries or other type of linguistic content. In one offline context, the similarity determination system 112 may be used as part of any background analysis task, such as the generation a ranking model, etc.

The post-processing module 114 can perform any action based on the similarity measure (or measures) produced by the similarity determination system 112. For example, the post-processing module 114 can correspond to a ranking module which ranks a plurality of documents, keywords, or ads, etc. based on the similarity scores and/or concept vectors associated with these linguistic items. The ranking module can also take into consideration any other ranking factors in ranking the linguistic items.

In another case, the post-processing module 114 can correspond to a filtering module. The filtering module may use the similarity measure associated with a particular linguistic item to determine whether to exclude the linguistic item in subsequent processing. For example, the filtering module can compare the similarity measure associated with a particular candidate keyword with a relevance threshold. If the similarity measure falls below the threshold, then the post-processing module 114 can exclude the keyword from subsequent processing.

Figure 2:
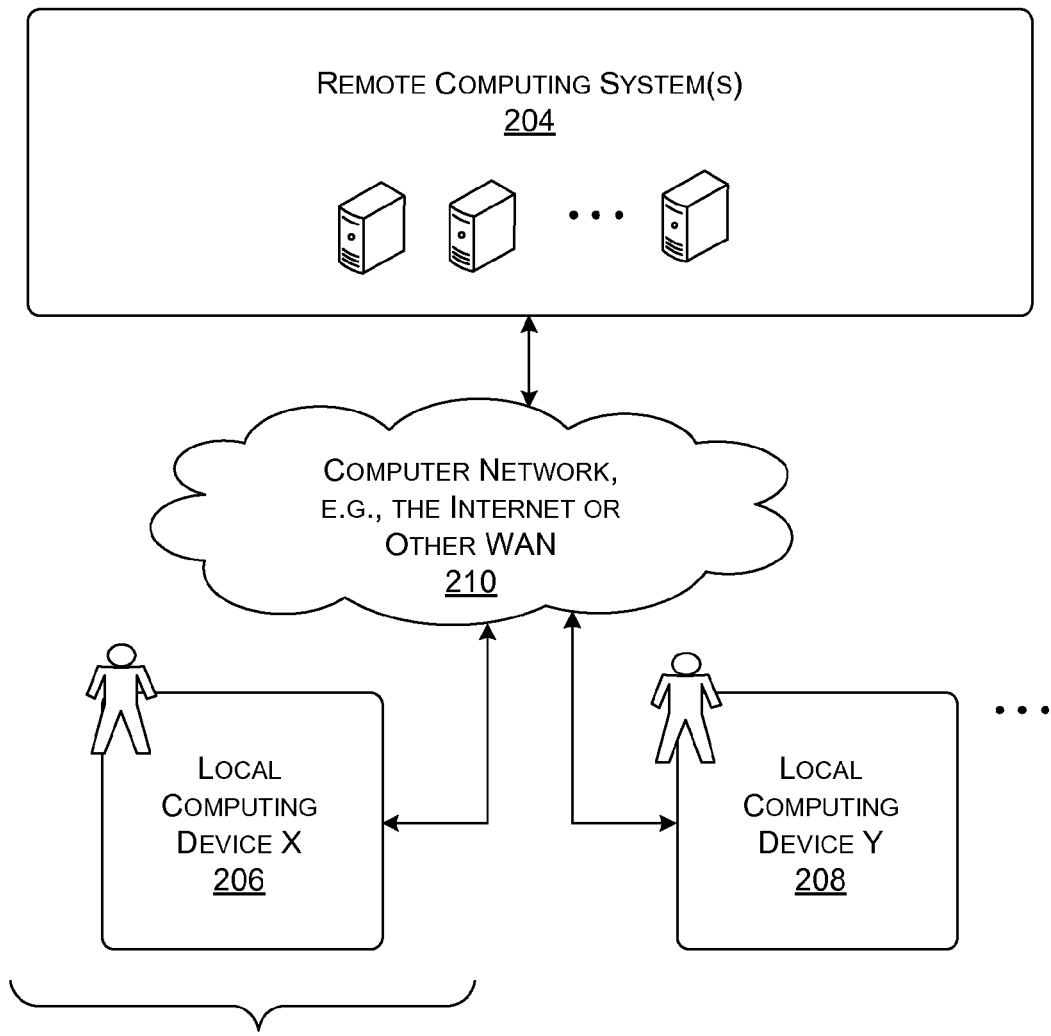
FIG. 2 shows one implementation of the environment of FIG. 1.

FIG. 2 shows a system 202 which represents one implementation of the environment 102 shown in FIG. 1. The system 202 includes one or more remote computing systems 204 (referred to in the singular below), and one or more local computing devices, such as representative local computing device 206 and local computing device 208, etc. The local computing devices (206, 208, . . . ) communicate with the remote computing system 204 via at least one computer network 210.

In one implementation, the remote computing system 204 can be implemented by one or more server computing devices and associated data stores, implemented at a single site or distributed over plural sites. For example, the remote computing system 204 may correspond to server computing devices and data stores provided by a commercial search system, such as the Bing® search system provided by Microsoft® Corporation of Redmond, Wash. Or the remote computing system 204 may correspond to server computing devices and data stores provided by any ad-delivery system, or the like. Each user device may represent any computing equipment, such as a desktop computing device, a laptop computing device, a game console device, a set-top box device, a tablet-type computing device, a smartphone or other type of telephone device, a media-consumption device (such as a music-playing device or a book reader device, etc.), a wearable computing device, and so on. The computer network 210 may correspond to a local area network, a wide area network (e.g., the Internet), point-to-point communication links, etc., or any combination thereof.

In one implementation, the remote computer system 204 implements all aspects of the environment 102 shown in FIG. 1, including the training system 104 and the analysis engine 110. Users may interact with the remote computing device 204 (e.g., to submit queries to the analysis engine 110) via respective local computing devices (206, 208, . . . ). In another case, functionality associated with the training system 104 and/or the analysis engine 110 may be distributed between the remote computing system 204 and one or more local computing devices (206, 208, . . . ). In yet another case, the entirety of the training system 104 and/or the analysis engine 110 is implemented by one or more local computing devices (206, 208, . . . ).

A.2. The Similarity Determination System

Figure 3:
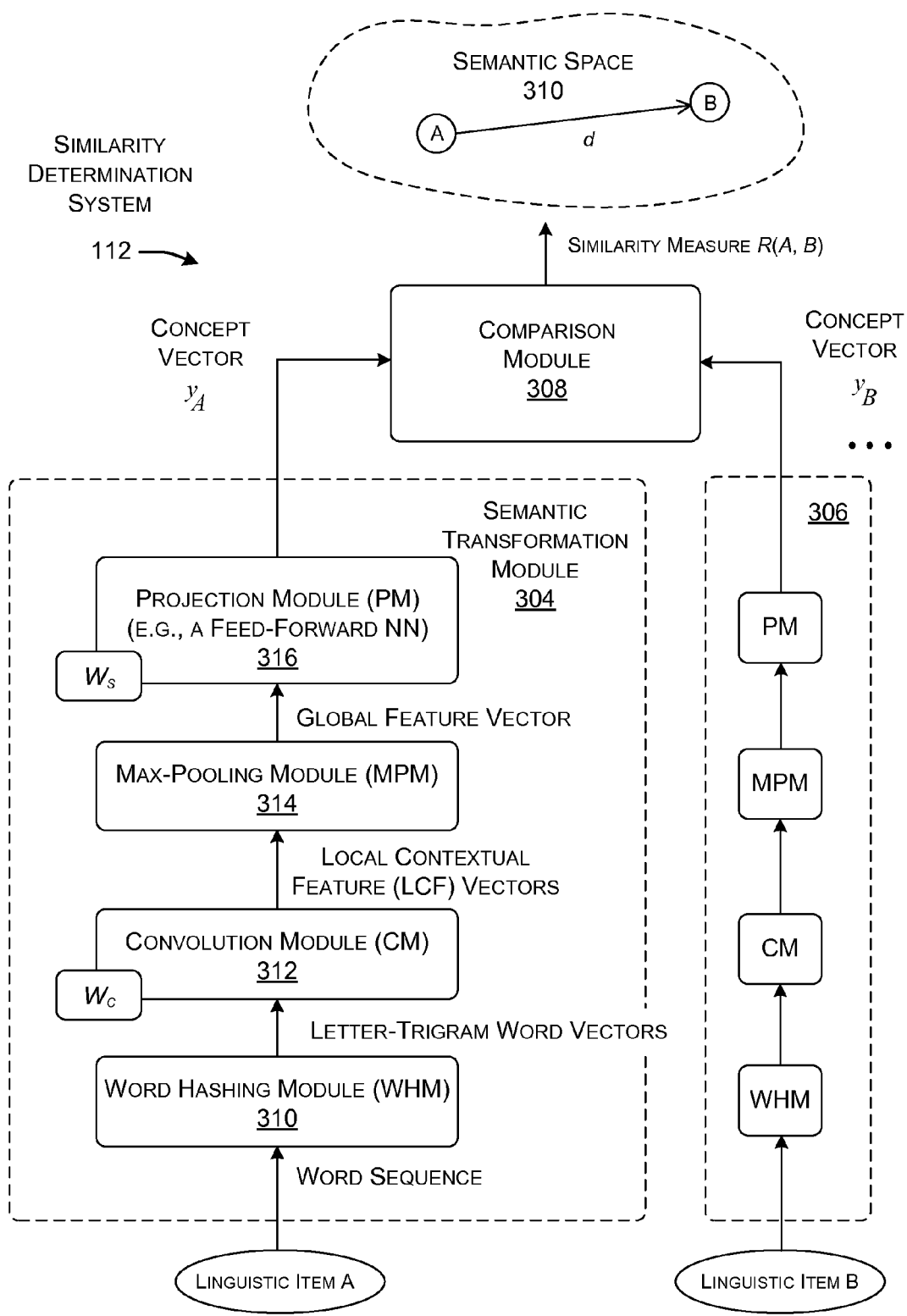
FIG. 3 shows one implementation of a similarity determination system, which is a component of the environment of FIG. 1. The similarity determination system may employ one or more instances of a semantic transformation module.

FIG. 3 shows one implementation of the similarity determination system 112 of FIG. 1. The similarity determination system 112 includes two or more semantic transformation modules. Each semantic transformation module maps an input vector, which represent a particular linguistic item (such as a query, document, keyword, etc.), into a particular concept vector. As explained in the preceding subsection, the concept vector expresses high-level semantic information regarding the linguistic item in a semantic space 302.

For example, a first semantic transformation module 304 generates a concept vector $y_A$ that describes high-level information regarding a linguistic item A. A second semantic transformation module 306 generates a concept vector $y_B$ that describes high-level information regarding a linguistic item B. Although not expressly shown in FIG. 3, the similarity determination system 112 can include many more semantic transformation modules. For example, in a document retrieval context, the semantic transformation module 304 can form a query concept vector $y_Q$ for a query, and other semantic transformation modules can form document concept vectors ($Y_{D1}, Y_{D2}, \ldots, Y_{Dn}$) for a plurality of respective documents (D1, D2, . . . , Dn).

In one case, the similarity determination system 112 can provide plural hardware components which implement plural respective semantic transformation modules, such as plural processing components within a parallel processing architecture. Alternatively, or in addition, the similarity determination system 112 can provide plural software-implemented semantic transformation modules, e.g., corresponding to respective computational threads. Alternatively, or in addition, the similarity determination system 112 can use a single actual semantic transformation module to process separate input vectors in series, for example, by projecting a set of documents into the semantic space 302, one after the other; in that case, the illustration of separate transformation modules in FIG. 3 represents different applications of the same underlying actual semantic transformation module.

A comparison module 308 uses any comparison technique to compare the concept vector $y_A$ with the concept vector $y_B$, to generate a similarity measure. For example, as will be described below, the comparison module 308 can use a cosine similarity technique to generate the similarity measure. Other instantiations of the comparison module 308 (not shown) can be used to compare other pairings of concept vectors. In yet another implementation context, the comparison module 308 can be used to perform comparison on two or more concept vectors, such as by forming clusters of similar cluster vectors.

Figure 4:
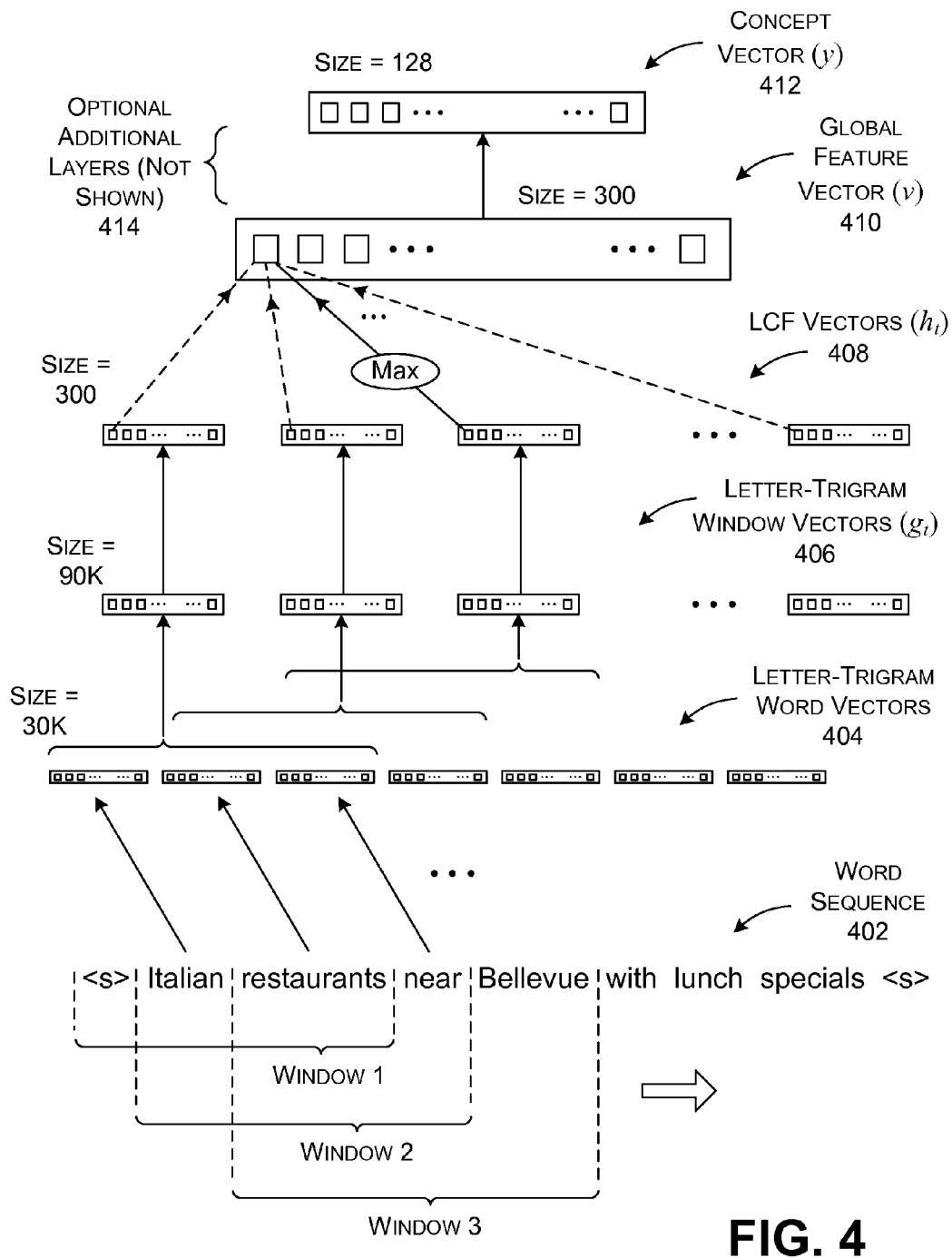
FIG. 4 shows information produced by a semantic transformation module of FIG. 3, at different stages of analysis performed by the semantic transformation module.

FIG. 3 shows an illustrative composition of the first semantic transformation module 304. The semantic transformation module 304 will be described below with reference to FIG. 4. More specifically, FIG. 4 shows different vectors produced by the semantic transformation module 304 at different respective stages of its analysis. Other semantic transformation modules (such as the second semantic transformation module 306) may have a similar composition and process flow compared to the first semantic transformation module 304.

To begin with, assume that the linguistic item A corresponds to a query that expresses a word sequence, such as the word sequence 402 shown in FIG. 4 which reads, "Italian restaurants near Bellevue with lunch specials." The intent of the user in submitting the query is to find information or ads regarding restaurants in the city of Bellevue, Wash., which offer Italian cuisine and lunch specials. In one case, the user may enter such a query into a user interface provided by a search system, such as the Bing® search system.

As a first operation, a word hashing module 310 can add dummy tokens to the beginning and ending of the word sequence 402, such as the symbol "<s>" shown in FIG. 4. The word hashing module 310 can then form a letter-n-gram representation of each word in the word sequence 402. For example, consider the first word, "Italian," in the word sequence 402. The word hashing module 310 can form a letter-trigram representation of this word by moving a three-letter window across the word to produce a succession of three-letter character groupings, e.g., to produce "<s>It", "Ita", "tal", "ali," "lia," "ian", and so on.

The word hashing module 310 then forms a letter-trigram word vector for each word that expresses the particular letter-trigrams that appear in the word, where the term "letter-trigram word vector" refers to a representation of a word based on a letter-trigram construction. More specifically, the letter-trigram word vector has a number of dimensions corresponding to the total number of three-letter sequences that may appear in a particular natural language, such as English. (But the vector may optionally exclude certain uninteresting letter-trigrams for application-specific reasons.) The word hashing module 310 can form a letter-trigram word vector for a particular word by counting the number of letter-trigrams of each particular type that appear in the word, and then setting values, at corresponding dimensions in the vector, to reflect those counts. For example, the word "Italian" would include a "1" entry for each of the trigrams described above ("<s>It", "Ita", "tal", "ali," "lia", "ian", etc.), and a "0" entry for all other dimensions, or vice versa. If a particular letter-trigram appears more than once in a particular word, then the count for that dimension would reflect how many times that letter-trigram appears in the word.

As a result of the above operation, the word hashing module 310 forms a set of seven letter-trigram word vectors 404 shown in FIG. 4, one for each word in the word sequence 402. In one non-limiting implementation, each letter-trigram word vector has a dimensionality of 30,000, corresponding to the total number of unique letter-trigrams that can appear in a particular word vocabulary. Each letter-trigram word vector is sparsely populated in the sense that it includes only a small number of non-zero entries.

In an alternative implementation, the semantic transformation module 304 may omit the word hashing module 310. Instead, the semantic transformation module 304 can form input word vectors that allocate a dimension for each complete word that can appear in a vocabulary, rather than each letter-n-gram. That is, in the above example, the alternative word vector for the word "Italian" will have a single non-zero entry for the dimension associated with the word "Italian." As can be appreciated, the alternative whole-word (word-gram) vector will have a much higher dimensionality compared to the letter-trigram vector. It may be desirable in some implementations to use a letter-n-gram vector representation rather than a whole-word vector representation to reduce the amount of resources that are required to train the model 106, and to subsequently apply the model in the similarity determination system 112. But other implementations can use other types of letter-n-gram representations, not necessarily letter-trigram representations. Further, other implementations can transform each linguistic item into its phonetic representation prior to forming n-grams.

In a next stage, a convolution module 312 slides an n-word window across the word sequence 402, to identify a series of word groupings, each formed by z consecutive words. For example, the convolution module 312 identifies a first word grouping having the words "<s> Italian restaurants," a second word grouping having the words "Italian restaurants near," a third word grouping having the words "restaurants near Bellevue," and so on. The convolution module 312 then performs an identical transformation operation on each word grouping, first to produce a plurality of letter-n-gram window vectors 406 by concatenating the letter-n-gram word vector of each word in the window, and then to transform each letter-n-gram window vector into a local contextual feature (LCF) vector.

More specifically, consider the operations of the convolution module 312 with respect to a particular window, such as the window that identifies the three words "Italian," "restaurants," and "near." The convolution module 312 concatenates the letter-trigram word vectors associated with the words in the window, to form a letter-trigram window vector (where the term "letter-trigram window vector" refers to a representation of a window using a letter-trigram construction). The letter-trigram window vector has 90,000 dimensions in the particular example of FIG. 4 because it is formed by concatenating three 30,000-dimension vectors. Overall, as shown in FIG. 4, the convolution module 312 produces a total number T of letter-trigram window vectors 406, with letter-trigram window vector $g_t$ referring to one of the T letter-trigram window vectors.

Next, the convolution module 312 transforms each letter-trigram window vector ($g_t$) into a local contextual feature (LCF) vector ($h_t$), using a matrix $W_c$, referred to as the convolution matrix. This operation yields a total number T of local contextual feature (LCF) vectors 408. More specifically, the convolution module 312 may compute a particular LCF vector $h_t$ as:

$$h_t = \tanh(W_c \cdot g_t) \qquad (1).$$

The tan h function constitutes a particular activation function, and is given by:

$$\tanh(x) = \frac{1 - e^{-2x}}{1 + e^{-2x}}. \qquad (2)$$

In other words, the elements of each particular letter-trigram window vector $g_t$ constitute neurons of one layer of a neural network. Likewise, the elements of each particular LCF vector $h_t$ constitute neurons in another, subsequent, layer of the neural network (where "subsequent" is in reference to the direction of information flow with the neural network). Equations (1) and (2) describe how the values of the neurons in the LCF vector $h_t$ are computed based on the values of the neurons in the corresponding letter-trigram window vector $g_t$.

The LCF vectors 408 are expressed in a space in which similar words, used in a similar context, appear "close" to each other in the space. For example, consider a query that reads, "auto body shop," relative to a first document having the phrase "calculate body fat," and a second document having the phrase "car body repair." Assume that the convolution module 312 projects all of these three-word sequences into respective LCF vectors. The LCF vector of the second document will be more similar to the LCF vector of the query, compared to the LCF vector of the first document. In other words, the convolution module 312 has successfully captured the context in which the ambiguous word "body" is being used in the respective linguistic items. The semantic transformation module 304 can leverage the LCF vectors by more accurately expressing the higher-level (e.g., global) meaning of the word sequence 402 as a whole.

Overall, as stated above, the convolution module 312 produces a number (T) of letter-trigram window vectors and corresponding LCF vectors, where that number (T) that depends on the number of words in the word sequence 402. Each LCF vector may have a greatly reduced dimensionality compared to its corresponding letter-trigram window vector, and its contributing letter-trigram word vectors. For example, the LCF vector may have (in one non-limiting case) a dimensionality of 300, whereas its corresponding letter-trigram window vector has a dimensionality of 90,000.

In a next phase of operation, a max-pooling module 314 forms a single global feature vector v (410) by pulling respective maximum values from the LCF vectors 408. More specifically, consider the first element of the global feature vector v, corresponding to the first dimension of that vector. The max-pooling module 314 identifies the values expressed by the corresponding first elements of the LCF vectors, and then selects the maximum value among those values. The max-pooling module 314 then inserts that maximum value into the first element of the global feature vector v. More formally stated, the values of the global feature vector can be computed by the equation:

$$v(i) = \max_{t=1,\ldots T} \{h_t(i)\}, i = 1, \ldots K. \qquad (3)$$

Here, i refers to a particular element and a particular dimension in the global feature vector v, and, correspondingly, in each of the T LCF vectors, $h_t$. K is the total number of elements (and dimensions) in the global feature vector. More specifically, the global feature vector v has the same dimensionality of each of the individual LCF vectors, e.g., 300 in one particular case.

From a high-level standpoint, the max-pooling operation has the effect of selecting the most semantically salient words in the input word sequence 402. Stated in the negative, the max-pooling operation has the effect of filtering out low-relevance words that do not significantly contribute to assessing the overall meaning of the word sequence 402. For example, consider the illustrative word sequence, "online body fat percent calculator." In one non-limiting example, the max-pooling operation may find that the words "body," "fat," and "calculator" are the most semantically salient words in the word sequence.

Finally, a projection module 316 projects the global feature vector v into a continuous-valued concept vector y (412) using a semantic projection matrix $W_s$. More specifically, the projection module 316 may generate the concept vector y using the following equation:

$$y = \tan h(W_s \cdot v) \quad (4).$$

The tan h function may correspond to the same activation function expressed by Equation (2). In other words, the elements of the global feature vector v constitute neurons in a one layer of a feed-forward neural network. Likewise, the elements of each particular concept vector y constitute neurons in another, subsequent, layer of the neural network. Equations (4) and (2) describe how the values of the neurons in the concept vector y are computed from the values of the neurons in the global feature vector v. In other implementations, the projection module 316 produces the concept vector y by transforming the global feature vector v using one or more additional intermediate neural network layers 414 (not specifically shown in FIG. 4). In that case, the projection module 316 forms a multi-layer deep learning neural network. Overall, the concept vector y accurately represents both the local linguistic context of words in the linguistic item, as well as the global meaning of the linguistic item as a whole.

Although not shown in detail, the second semantic transformation module 306 performs the same operations described above to produce another concept vector. More specifically, assume that the first semantic transformation module 304 produces a concept vector $y_A$ associated with the linguistic item A, while the second semantic transformation module 306 produces a concept vector $y_B$ associated with the linguistic item B. The comparison module 308 computes the similarity between the concept vector $y_A$ and the concept vector $y_B$ in the semantic space 302, e.g., using the following cosine similarity equation:

$$R(A, B) = \text{cosine}(y_A, y_B) = \frac{y_A^T y_B}{\|y_A\| \|y_B\|}. \quad (5)$$

That is, the value R(A, B), referred to herein as a similarity measure, reflects the similarity or closeness between the linguistic item A and the linguistic item B in the semantic space 302. Other instantiations of the comparison module 308 can compute the similarity between other pairs of linguistic items. For example, assume that the task of the analysis engine 110 is to compute the similarity between a query and a plurality of documents. Each instantiation of the comparison model 308 can compute the similarity between the query and a particular document in the set of documents. Or a single comparison module 308 can perform all comparisons for all of the concept vectors generated by the semantic transformation modules (304, 306, . . . ).

A.3. Applications of the Similarity Determination System

Figure 5:
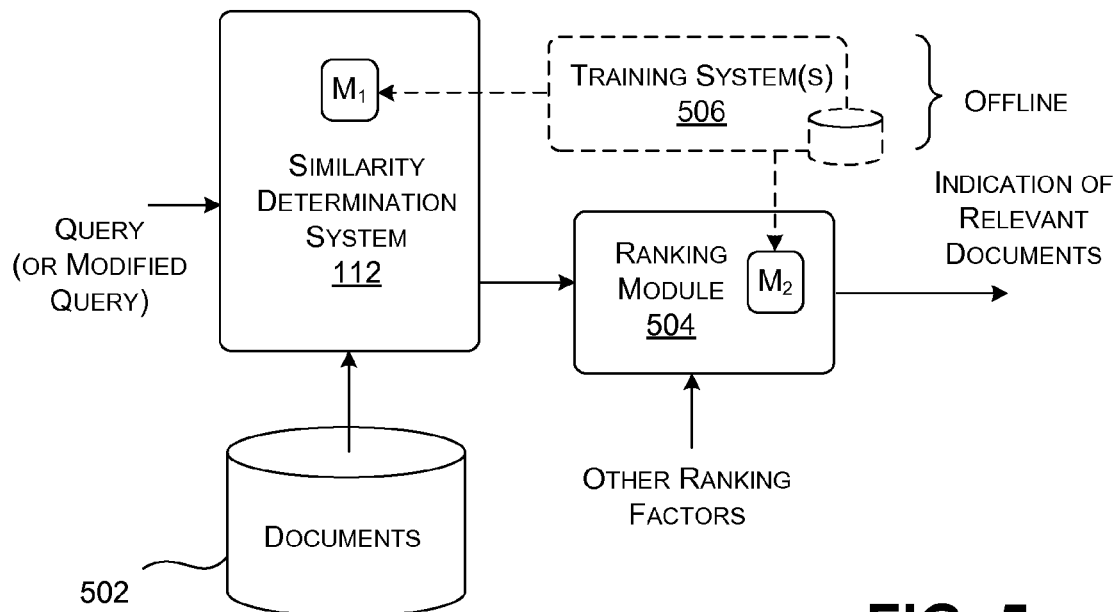
FIGS. 5-8 show different respective applications of the analysis engine of FIG. 1.

FIG. 5 shows a first application of the analysis engine 110 of FIG. 1. In this environment, the similarity determination system 112 compares an input query against a plurality of documents provided in a data store 502. As used herein, the term "query" is intended to have broad connotation; it refers to alphanumeric information that is input by the user in any traditional manner, as well as other textual and non-textual information that may reflect the user's present search intent. For example, the query can describe information that appears in any body of text created, selected, or received by the user. In addition, or alternatively, the query can describe the location of the user, the demographic characteristics of the user, the prior online behavior of the user, and so on. A processing environment may apply appropriate privacy-related safeguards and protocols with respect to any personal data that it collects regarding the user (as described in Section C).

Further, although not shown, in each of FIGS. 5-8, one or more modules may operate on the input query prior to feeding the query into the similarity determination system 112. For example, the module(s) may modify the query in any manner, such as by performing synonym replacement and/or expansion, spelling correction, various normalization and conversion operations, and so on. Hence, in the context of the figures in this section, the "query" may refer to the original query, or one or more altered versions of the original query.

In operation, the similarity determination system 112 of FIG. 5 projects a submitted query into a query concept vector using the functionality described in Subsection A.2 above. The similarity determination system 112 also projects each document into a document concept vector using the functionality described in Subsection A.2. More specifically, in one case, the similarity determination system 112 can dynamically compute each document concept vector, e.g., at the time that the user inputs the query. In another case, the similarity determination system 112 can compute each document concept vector in a backend offline process, before the receipt of the query. The similarity determination system 112 can then compare the query concept vector with each respective document concept vector, to produce a similarity measure for that particular pairing. As a final outcome, the similarity determination system 112 can provide a plurality similarity measures for the documents, reflecting the extent to which the documents are semantically similar to the query.

A ranking module 504 may rank the documents in order of relevance based on a collection of environment-specific ranking features, including at least the similarity measures and/or the query and document concept vectors. Other assessment engines (not shown) can generate the other ranking features, that may be fed into the ranking module 504, based on any other considerations, such as lexical-based considerations. The ranking module 504 can perform ranking in any manner, such as by generating a weighted combination of different ranking features, applying a machine-learned ranking model, applying an environment-specific algorithm, and so on.

One or more training systems 506 (referred to in the singular below) may, as an offline process, produce the deep learning model $M_1$ that is used by the similarity determination system 112 in projecting input vectors into concept vectors. For example, the deep learning model $M_1$ may correspond to a convolutional latent semantic model described above. The training system 506 may also, as a separate offline machine-learning process, produce a ranking model $M_2$ that is used by the ranking module 504 to rank documents based on the similarity measures, concept vectors, and any other document-ranking features.

Figure 6:
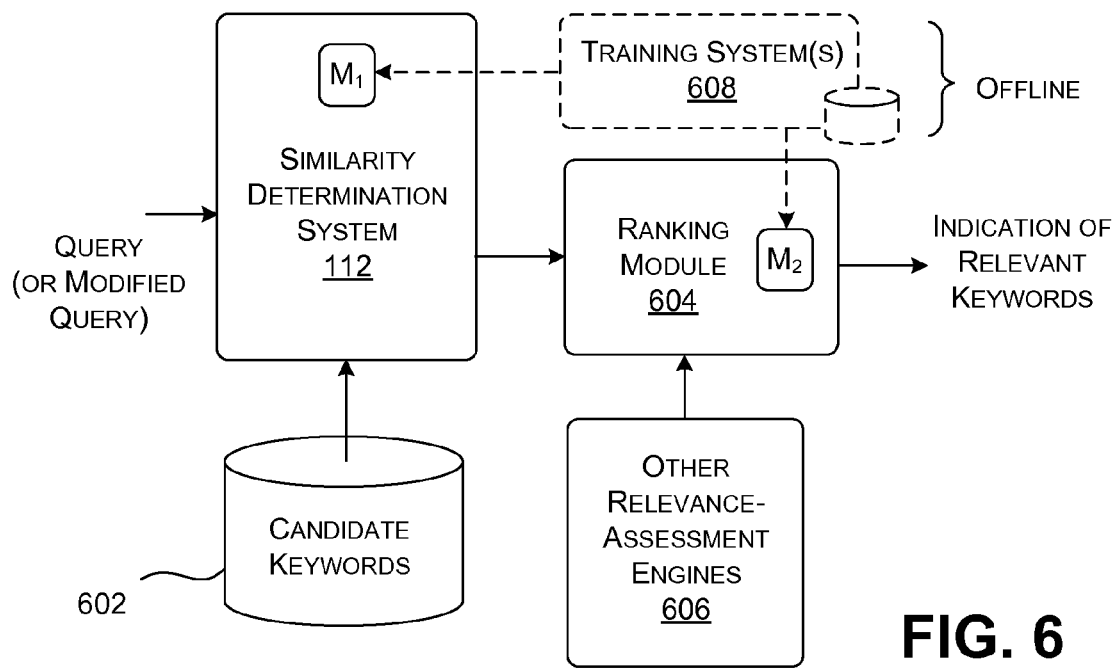

FIG. 6 shows a second application of the analysis engine 110 of FIG. 1. In this environment, the similarity determination system 112 compares an input query against a plurality of candidate ad keywords provided in a data store 602. By way of introduction, an ad keyword corresponds to a sequence of one or more words that an advertiser may associate with an ad campaign, pertaining to one or more ads. For example, the advertiser may choose a keyword sequence "Mexican food Bellevue express," and then associate that keyword sequence with one or more ads describing a Mexican restaurant in the City of Bellevue, Wash. An advertising system may subsequently compare an end user's query against a plurality of candidate keywords. If a query is determined to be sufficiently similar to a particular keyword, then the advertising system may present any advertisements that have been previously associated with the keyword. For example, the advertising system may match the query "Quick Southwest food in Bellevue" to the above-described keyword sequence, "Mexican food Bellevue express," and thereafter present one or more ads that are linked to the matching keyword. It is therefore important to intelligently match incoming queries with appropriate keywords, e.g., to improve the relevance of ads that are presented to the user, and to also increase the revenue of the advertising system (which may receive payment each time a user clicks on a presented ad, and/or performs some other conversion-related action with respect to the presented ad).

In operation, the similarity determination system 112 performs the same functions described above with respect to FIG. 5, but now with reference to candidate keywords instead of documents. As a final outcome, the similarity determination system 112 can provide a plurality similarity measures for the candidate keywords, reflecting the extent to which the keywords are semantically similar to the query.

A ranking module 604 may rank the keywords in order of relevance based on a collection of environment-specific ranking features, including at least the similarity measures and/or the query and keyword concept vectors. Other relevance-assessment engines 606 can also independently assess the relevance of candidate keywords, and feed their conclusions (expressed as features) into the ranking module 604. For example, another relevance-assessment engine can determine the relevance of a candidate keyword based on a lexical-based comparison between the input query and the candidate keyword. The ranking module 604 can perform ranking in any manner, such as by generating a weighted combination of different ranking features, applying a machine-learned ranking model, applying an environment-specific algorithm, and so on.

A training system 608 may, as an offline process, produce the deep learning model $M_1$ that is used by the similarity determination system 112 in projecting input vectors into concept vectors. The training system 608 may also, as a separate offline machine-learning process, produce a ranking model $M_2$ that is used by the ranking module 604 to rank documents based on the similarity measures, concept vectors, and any other keyword-ranking features.

Figure 7:
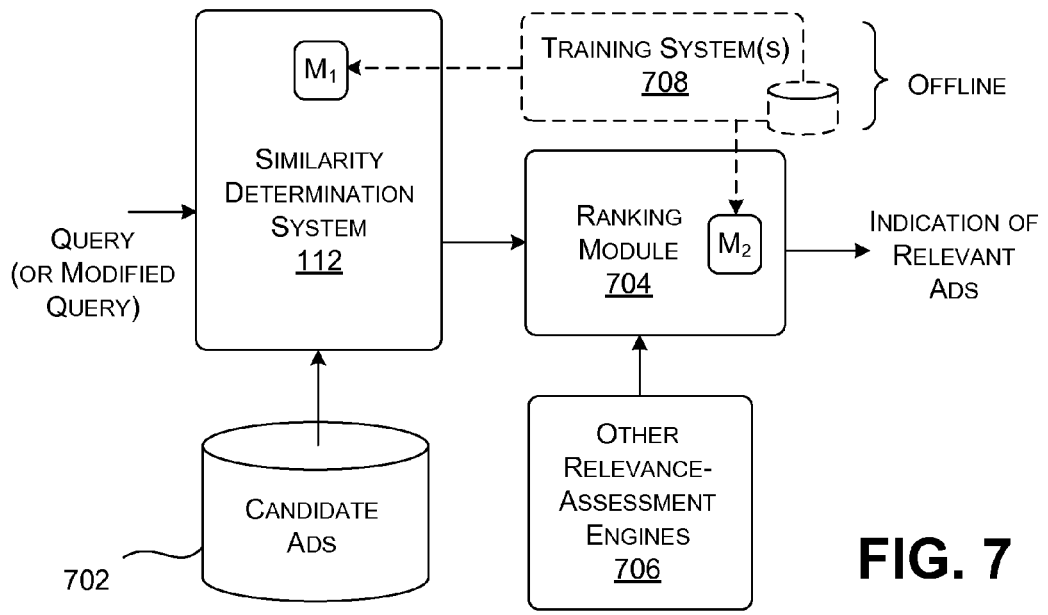

FIG. 7 shows a third application of the analysis engine 110 of FIG. 1. In this environment, the similarity determination system 112 compares an input query directly against a plurality of text-bearing ads provided in a data store 702. In operation, the similarity determination system 112 performs the same functions described above with respect to FIGS. 5 and 6, but now with reference to ads instead of documents or keywords. As a final outcome, the similarity determination system 112 can provide a plurality similarity measures for the ads, reflecting the extent to which the ads are semantically similar to the query. These similarity measures may be regarded as query-to-ad similarity measures because they measure the similarity between the query and the candidate ads.

A ranking module 704 may rank the ads in order of relevance based on a collection of environment-specific ranking features, including at least the similarity measures and/or the query vectors and ad concept vectors. Other relevance-assessment engines 706 can also independently assess the relevance of candidate ads, and feed their conclusions (expressed as features) into the ranking module 604. A training system 708 may, as an offline process, produce the deep learning model $M_1$ that is used by the similarity determination system 112, and a ranking model $M_2$ that is used by the ranking module 604.

Alternatively, or in addition, the similarity determination system 112 can receive input linguistic items which correspond to two or more parts of each ad. For example, a first linguistic item may correspond to the title of the ad, a second linguistic item may correspond to a keyword associated with the ad, and a third linguistic item may correspond to the context (e.g., body) associated with the ad. The similarity determination system 112 may then use the functionality described in Subsection A.2 to generate concept vectors for all these ad parts, referred to as item-part concept vectors. The similarity determination system 112 can then generate similarity measures between pairs of these ad parts. Or the similarity determination system 112 can generate a single similarity measure for an ad which indicates the extent to which all the ad parts conform to a coherent topic (e.g., by forming a coherent semantic cluster of concept vectors), and so on. Such similarity measures have a bearing on the quality of the ad, and therefore may be referred to as quality measures. For instance, an advertising system may regard an internally inconsistent ad as having low quality, because there is uncertainty as to the topic to which it pertains, and therefore a risk that it may be inappropriately applied. The ranking module 704 can take the quality measure(s) of a candidate ad into account in ranking the ad, along with all the other features described above, including the query-to-ad similarity measure for the ad.

Figure 8:
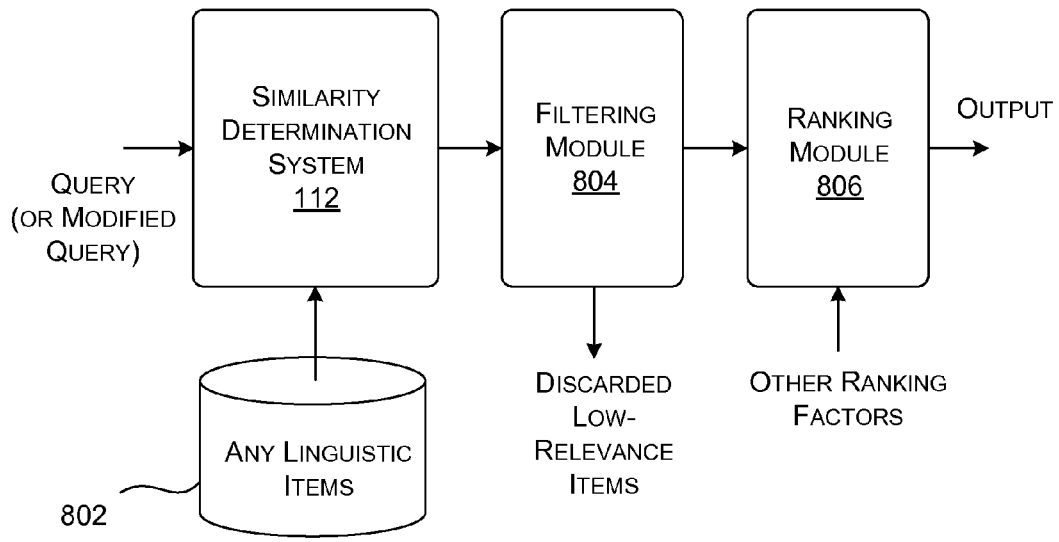

FIG. 8 shows a scenario in which the similarity determination system 112 receives an input query and one or more other linguistic items from a data store 802. The linguistic items may correspond to any items set forth above, such as documents ad-related items, etc. An ad-related item, in turn, refers to either a keyword, an ad part (e.g., an ad title, an ad body, etc.), or an entire ad, or some other linguistic item that pertains to an advertising-related environment. The similarity determination system 112 computes concept vectors for all of the input items described above. Based on the concept vectors, the similarity determination system 112 then determines any of the types of similarity measures described above, such as query-to-keyword concept vectors, query-to-ad concept vectors, ad-part-to-ad-part concept vectors, and so on.

A filtering module 804 performs a filtering operation based on a collection of environment-specific filtering features, including any of the similarity measures and/or concept vectors described above. For example, the filtering module 804 can filter out keywords and/or ads that have low relevance with respect to the input query. For example, the filtering module 804 can exclude a particular candidate keyword or ad if its similarity measure is below a prescribed application-specific threshold. In addition, or alternatively, the filtering module 804 can filter out ads that have low quality measures, e.g., based on an assessment that they have semantically dissimilar parts.

A ranking module 806 or any other processing module receives the output of the filtering module 804; that output may include an indication of the candidate linguistic items which have passed the filtering test applied by the filtering module 804, together with the similarity measures and/or concept vectors associated with those items. The ranking module 806 can then perform further ranking-related processing on the linguistic items based on a collection of environment-specific features, including the various similarity measures and concept vectors described above. In other cases, the filtering module 804 can identify low-relevance linguistic items, and then route those linguistic items for additional processing, rather than immediately excluding them. In yet other cases, the filtering module 804 may be used to identify linguistic items that are highly relevant. Note that FIG. 8 omits certain details of previous figures (e.g., the other relevance-assessment engines, the training system, etc.) to simplify the figure; but these components can be used in conjunction with the functionality of FIG. 8. For example, a training system can generate machine-trained models for the filtering module 804 and the ranking module 806.

The scenarios shown in FIGS. 5-8 involve the online processing of queries that are submitted by users. In other implementations, an environment may use the similarity determination system 112 to process queries or any other linguistic items in an offline setting. For example, an offline evaluation engine can use the similarity determination system 112 to explore the semantic relationship between queries and keywords, or queries and ads, and so on. The offline evaluation engine can then use the results of that analysis to improve the accuracy of its ranking models, e.g., by training new ranking models based, in part, on the similarity measures. For instance, the training systems (506, 608, 708) may perform the above described task as an offline process.

In another case, an environment may use the similarity determination system 112 in the context of an advertiser-facing tool. The tool may allow advertisers to explore the consequences of choosing particular keywords for an ad campaign. Still other applications are possible.

In other cases, the similarity determination system 112 can operate on other types of linguistic items, in addition to, or instead of, queries, documents, keywords, ads, etc.

A.4. The Training System

Figure 9:
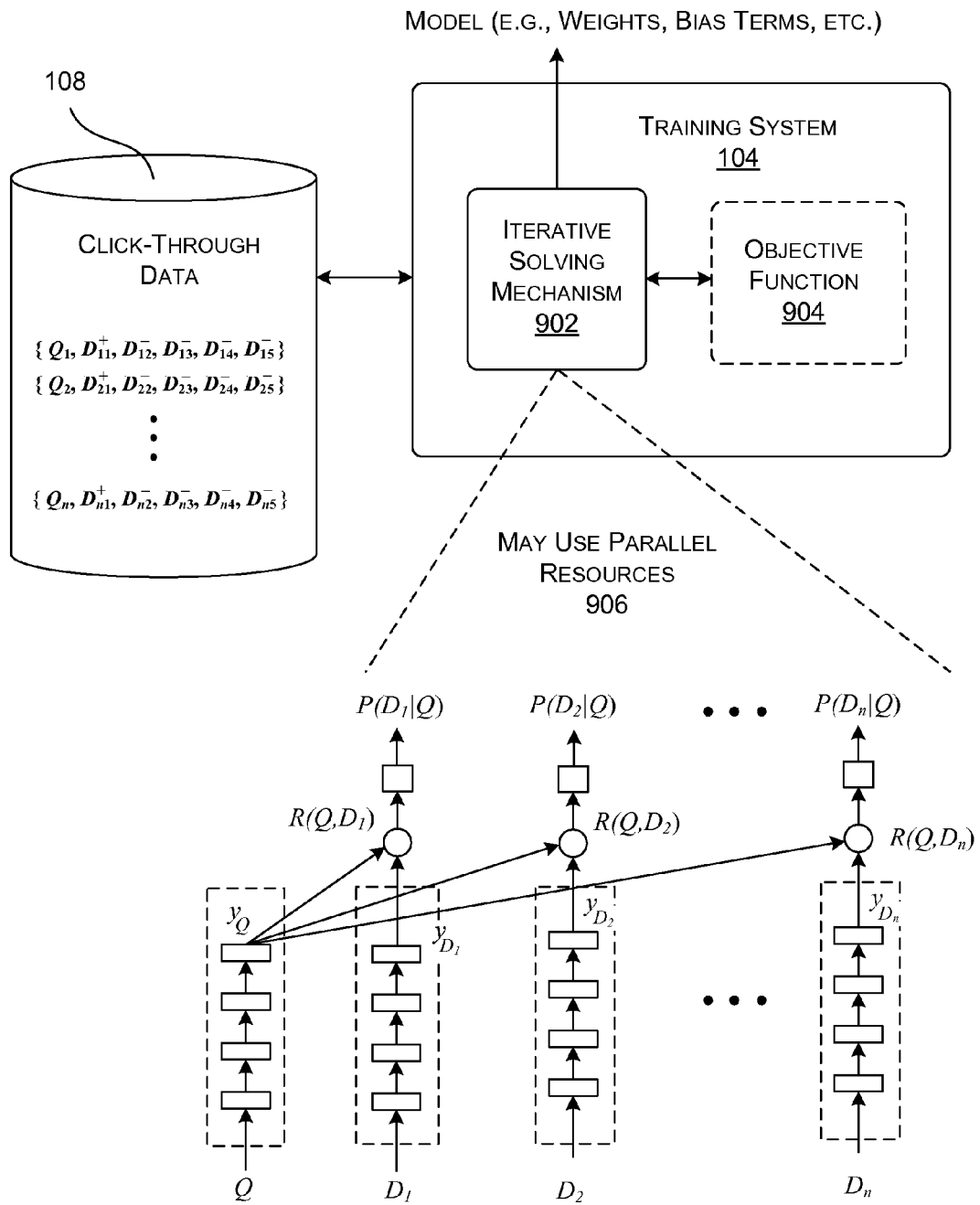
FIG. 9 shows one implementation of a training system, also shown in FIG. 1. The training system produces the convolutional latent semantic model used by the similarity determination system (of FIGS. 1 and 3).

FIG. 9 shows one implementation of the training system 104 of FIG. 1. The training system 104 processes a corpus of click-through data (provided in a data store 108), to generate the model 106. The model 106 represents the matrices described above, namely the convolution matrix $W_c$ and the semantic projection matrix $W_s$. Collectively, the parameter values associated with the model 106 are referred to using the symbol $\Lambda$.

The click-through data generally describes queries submitted by actual users over some span of time, together with an indication of linguistic items that the users clicked on, and the linguistic items that the users failed to click on, after submitting those queries. More specifically, this section will be framed in the context in which the linguistic items that the users clicked on correspond to documents. But in other application environments, the click-through data describes queries submitted by users over some span of time, together with an indication of the keywords that were matched to the queries, and which also subsequently resulted in users clicking on ads associated with those keywords.

Further, the term "click" is intended to have broad connotation. In a document-retrieval context, it may describe the case in which a user literally clicks on an entry within search results, or some other presentation of options, using a mouse device. But the term click also encompasses the cases in which a user selects a document in any other manner, such as by using a gesture on a touchscreen, a free-space gesture that is detected using a video camera, a keyboard action, etc. In other cases, the term click describes the case in which a user exhibits interest in a document, without expressly selecting the document, such as by hovering over an entry associated with the document, or gazing at the document (which can be detected by eye gaze recognition technology), and so on. Likewise, the terms "query" and "document" have broad meaning, each encompassing any linguistic information that includes one or more strings.

In whatever manner formed, the click-through data encompasses a plurality of instances of training data, each constituting a training example. Each example includes a query (Q), a document ($D^+$) that the user selected in response to the query, and at least one document ($D^-$) that the user did not select in response to the query. In one case, a data collection module can mine this information from archives of a search engine. In that situation, a non-clicked document ($D^-$) of a training instance may correspond to an actual document that was offered to a user in response to a query, but which the user declined to select. In other cases, the collection module can randomly select any document from a corpus of documents, so long as the user did not actually select that document in response to the query. But in this latter case, there is no requirement that this document $D^-$ was actually presented to the user. In any case, FIG. 9 shows that a training example includes four non-clicked documents $\{D_2^-, D_3^-, D_4^-, D_5^-\}$, but a training example can include any number of such documents.

In one implementation, in a preliminary operation, the training system 104 operates on the linguistic items in the training set, as expressed in letter-trigram window vector form. Hence, in a preliminary operation, a hashing process can convert the queries and documents to their respective letter-trigram window vector forms.

The training system 104 operates by using an iterative solving mechanism 902 to iteratively achieve an objective defined an objective function 904, by iteratively changing the parameter values of the model $\Lambda$. When the iterative processing is finished, the final parameter values constitute the trained model $\Lambda$. The objective function 904, in turn, mathematically expresses an aim which the model $\Lambda$ seeks to achieve, when fully trained. In the present case, the objective function stipulates that the conditional likelihood of the clicked documents, given respective queries, is to be maximized, and the conditional likelihood of non-clicked documents, given the queries, is to be reduced. In other words, the objective function attempts to make the assessed relevance of clicked documents as high as possible, while simultaneously attempting to make the assessed relevance of non-clicked documents as low as possible.

To mathematically derive the objective function, first note that the probability P (D|Q) of a clicked document (D$^+$) in a training example, given a query Q, can be expressed as a softmax function as follows:

$$P(D^+ | Q) = \frac{\exp(\psi R_\Lambda(Q, D^+))}{\sum_{D' \in D} \exp(\psi R_\Lambda(Q, D'))}. \quad (6)$$

The term $R_\Lambda(Q, D^+)$ represents the similarity between the query Q and the clicked document D$^+$ in the semantic space, for a given current selection of parameters associated with a model Λ. The term D represents the set of five documents in the training instance, including D$^+$ and the four non-clicked documents, although, as stated above, a training example can include any number of non-clicked documents. The term $R_\Lambda(Q, D')$ represents the similarity between the query Q and one of the documents (D') in the training example, in the semantic space. The symbol ψ represents an empirically-derived smoothing factor (e.g., which can be generated by analyzing a held-out dataset of training examples). For this individual training example, the objective function will express an attempt to make $R(Q, D^+)$ as high as possible, and each $R(Q, D^-)$ as low as possible, to overall make $P(D^+|Q)$ as high as possible, and each $P(D^-|Q)$ as low as possible.

Overall, when considering all of the training instances in the corpus of click-through data, the objective function involves attempting to maximize the conditional likelihood of the clicked documents given the corresponding queries, or equivalently, minimize the following loss equation:

$$L(\Lambda) = -\log \prod_{(Q,D^+)} P(D^+ | Q). \quad (7)$$

In other words, the objective is to derive a set of parameter values that minimizes the above equation, with respect to all of the examples in the empirical click-through data, or some subset thereof.

In one approach, the iterative solving mechanism 902 uses a gradient-based numerical optimization algorithm to solve the above problem, such as a gradient descent technique. The iterative solving mechanism 902, for instance, can apply the following update rule to perform the optimization:

$$\Lambda_t = \Lambda_{t-1} - \epsilon_t \frac{\partial \text{loss}(\Lambda)}{\partial \Lambda}\bigg|_{\Lambda = \Lambda_{t-1}}. \quad (8)$$

Here, ∂loss(Λ) correspond to a sample-wise loss function. $\Lambda_t$ and $\Lambda_{t-1}$ are the models at the t$^{th}$ and t−1$^{th}$ iteration, respectively, and $\epsilon_t$ is a learning rate parameter. From a high-level perspective, the iterative solving mechanism 902 makes a large change in the model Λ whenever the model Λ is changing by a relatively large amount from iteration to iteration, and makes a smaller change in the model Λ whenever the model Λ is changing by a slower amount.

The term $$\frac{\partial \text{loss}(\Lambda)}{\partial \Lambda}$$

can be derived as follows. First, the loss function derived above can be expressed as follows:

$$\text{loss}(\Lambda) = \log(1 + \Sigma_j \exp(-\psi \Delta_j)) \quad (9),$$

where $\Delta_j = R(Q, D^+) - R(Q, D_j^-)$. The gradient of the loss function with respect to the semantic projection matrix $W_s$ is:

$$\frac{\partial \text{loss}(\Lambda)}{\partial W_s} = \sum_j \alpha_j \frac{\partial \Delta_j}{\partial W_s}, \quad (10)$$

where:

$$\frac{\partial \Delta_j}{\partial W_s} = \frac{\partial R(Q, D^+)}{\partial W_s} - \frac{\partial R(Q, D_j^-)}{\partial W_s}, \quad (11)$$

and $$\alpha_j = \frac{-\psi \exp(-\psi \Delta_j)}{1 + \sum_{j'} \exp(-\psi \Delta_{j'})}. \quad (12)$$

To simplify the following notation, let a, b, and c correspond to $y_Q^T y_D$, $1/\|y_Q\|$, and $1/\|y_D\|$, respectively. Finally, assume that the activation function used by the model corresponds to the tan h function described above in Equation (2). With those definitions, each term in the right-hand side of Equation (11) can be calculated using the following formula:

$$\frac{\partial R(Q, D)}{\partial W_s} = \frac{\partial}{\partial W_s} \frac{y_Q^T y_D}{\|y_Q\|\|y_D\|} = \delta_{y_Q}^{(Q,D)} v_Q^T + \delta_{y_D}^{(Q,D)} v_D^T, \quad (13)$$

where, for a particular pair of (Q, D):

$$\delta_{y_Q}^{(Q,D)} = (1 - y_Q) \circ (1 + y_Q) \circ (bcy_D - acb^3 y_Q) \quad (14),$$

and $$\delta_{y_D}^{(Q,D)} = (1 - y_D) \circ (1 + y_D) \circ (bcy_Q - abc^3 y_D) \quad (15).$$

In the above equations, the operation ○ is an element-wise multiplication (i.e., a Hadamard product).

In order to compute the gradient of the loss function with respect to the convolution matrix $W_s$, {δ} is computed for each $\Delta_j$ at the max-pooling layer. More specifically, each δ in the max-pooling layer v can be calculated through back propagation as:

$$\delta_{v_Q}^{(Q,D)} = (1 + v_Q) \circ (1 - v_Q) \circ W_s^T \delta_{y_Q}^{(Q,D)} \quad (16)$$

and $$\delta_{v_D}^{(Q,D)} = (1 + v_D) \circ (1 - v_D) \circ W_s^T \delta_{y_D}^{(Q,D)} \quad (17).$$

To propagate the error from the max-pooling layer to the convolutional layer, it is appropriate to trace back to the local features that "win" in the max-pooling operation, as in:

$$t_Q(i) = \operatorname*{argmax}_{t=1,\ldots,T_Q} \{h_t(i)\}, i = 1, \ldots, K, \quad (18)$$

and

-continued $$t_D(i) = \underset{t=1,\ldots,T_D}{\mathrm{argmax}}\{h_t(i)\}, i = 1, \ldots, K. \quad (19)$$

Correspondingly, the gradient of the loss function with respect to the convolution matrix $W_c$ can be computed as:

$$\frac{\partial \mathrm{loss}(\Lambda)}{\partial W_c} = \sum_j \alpha_j \frac{\partial \Delta_j}{\partial W_c}, \quad (20)$$

where, for the i-th row of the convolution matrix, $$\frac{\partial \Delta_j}{\partial W_{c,i}} = \left(\delta_{v_Q}^{(Q,D^+)}(i)g_{Q,t_Q(i)}^T + \delta_{v_{D^+}}^{(Q,D^+)}(i)g_{D^+,t_{D^+}(i)}^T\right) - \left(\delta_{v_Q}^{(Q,D_j^-)}(i)g_{Q,t_Q(i)}^T + \delta_{v_{D_j^-}}^{(Q,D_j^-)}(i)g_{D_j^-,t_{D_j^-}(i)}^T\right). \quad (21)$$

can be computed as:

$$W_{c,i}, i = 1, \ldots, K, \frac{\partial \Delta_j}{\partial W_{c,i}}$$

Here, $\delta(i)$ is the i-th element of $\delta$, and $g_{Q,t}$ and $g_{D,t}$ are the letter-trigram window vectors at the t-th position of Q and D, respectively, as described above.

The training system 104 can perform the above-described processing using parallel processing resources 906. The parallel processing resources 906 can be implemented in any manner, e.g., using hardware units, software units, or a combination thereof. For example, the training system 104 can use an architecture similar to that shown in FIG. 3. Each separate document-processing unit, in whatever manner implemented, can include at least a convolution module (CM) for producing LCF vectors, a max-pooling module (MPM) for forming a global feature vector v, a projection module (PM) for generating an output concept vector $y_D$ in the semantic space, a comparison module for generating the similarity measure R(Q, D), and a softmax module for generating P (D|Q). Another processing unit can generate a representation $y_Q$ of the query Q in the semantic space.

B. Illustrative Processes

FIGS. 10-13 explain the various components of FIG. 1 in flowchart form. Since the principles underlying the operation of these components have already been described in Section A, certain operations will be addressed in summary fashion in this section.

Figure 10:
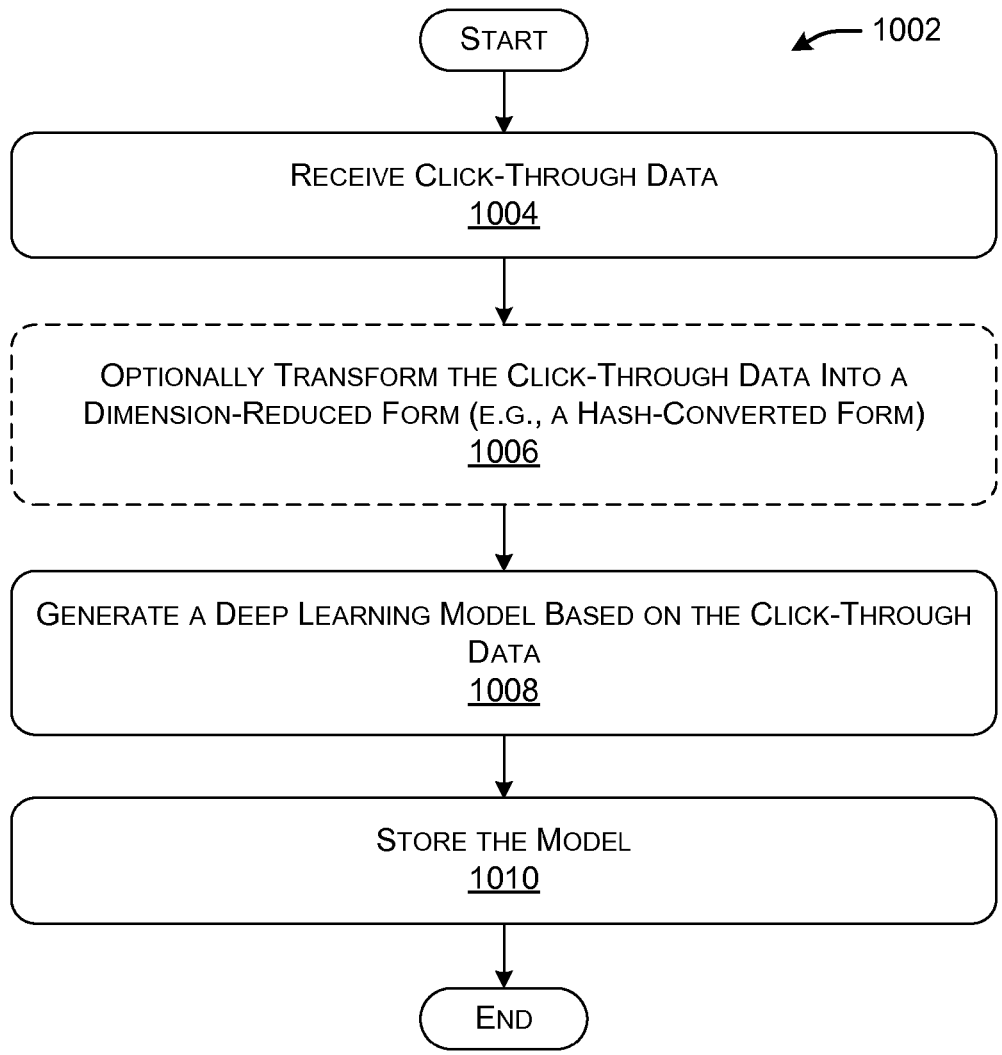
FIG. 10 is a flowchart that shows one illustrative manner of operation of the training system of FIG. 9.

Starting with FIG. 10, this figure shows a procedure 1002 by which the training system 104 produces the model 106. In block 1004, the training system 104 receives click-through data, e.g., from a search log archive provided by a search system, or from some other source. In block 1006, the training system 104 optionally transforms queries and documents in the click-through data into a dimension-reduced form. This yields lower-dimension items, such as letter-trigram window vectors. In block 1008, the training system 104 generates the model 106 using the lower-dimension items (or the original input items). In one approach, the training system 104 performs this training such that the conditional likelihood of clicked documents, given respective queries, is maximized, and the conditional likelihood of non-clicked documents, given the queries, is reduced. In block 1010, the training system 104 stores the model 106. For instance, block 1010 may constitute installing the model 106 in a search engine or advertising system.

Figure 11:
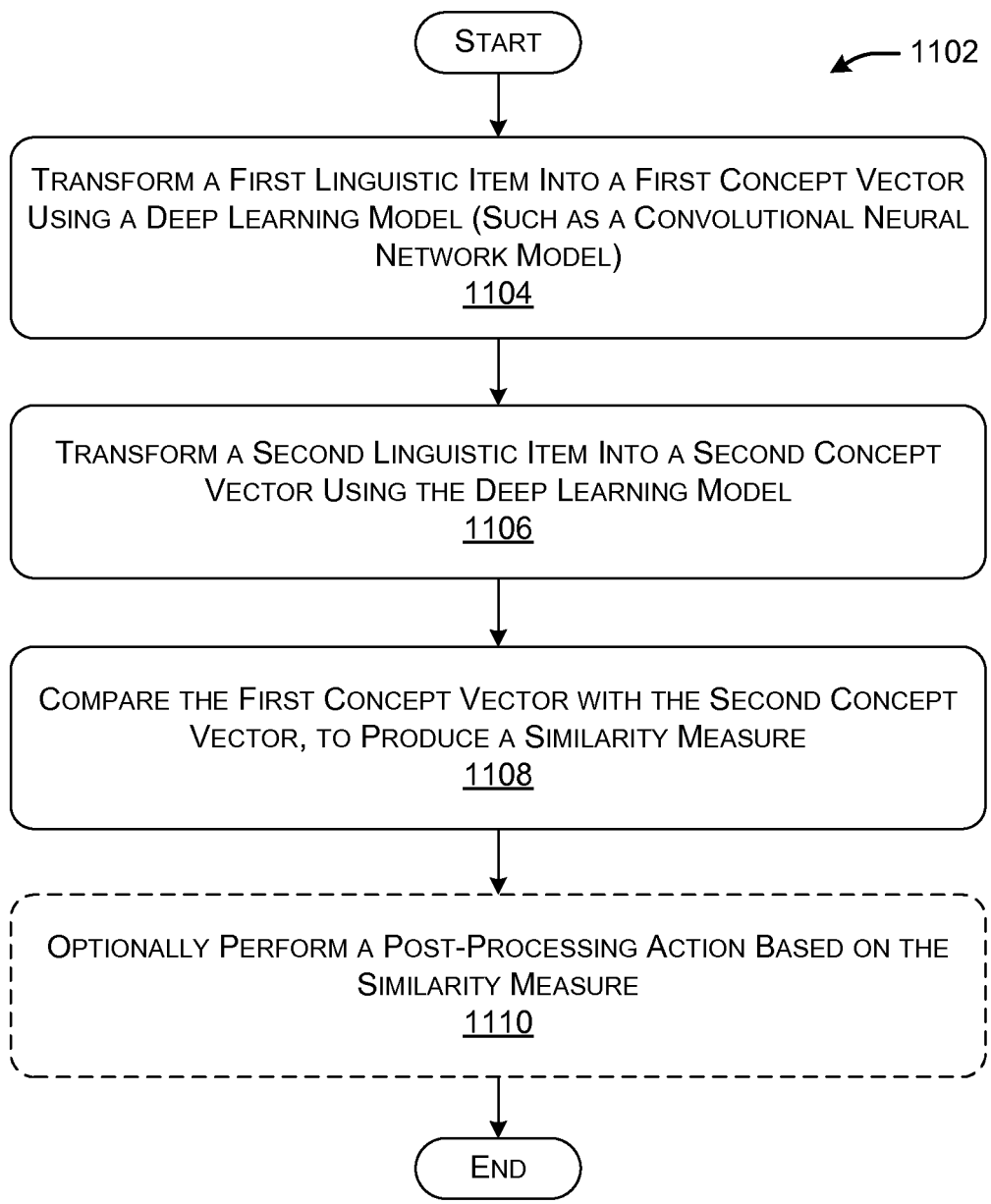
FIG. 11 is a flowchart that shows one illustrative manner of operation of the analysis engine of FIG. 1.

FIG. 11 shows a procedure 1102 which describes the operation of the analysis engine 110 of FIGS. 1 and 3, with respect to the comparison of two linguistic items. The same procedure 1102 can be applied to yield a comparison among any number of linguistic items. In block 1104, the similarity determination system transforms a first linguistic item into a first concept vector using a deep learning model, such as a convolutional neural network. In block 1106, the similarity determination system 112 transforms a second linguistic item into a second concept vector using the deep learning model. Blocks 1104 and 1106 can be performed in online fashion and/or offline fashion. In block 1108, the similarity determination system 112 compares the first concept vector with the second concept vector to produce a similarity measure. In block 1110, the post-processing module 114 optionally performs a post-processing operation based on the similarity measure computed in block 1108. The post-processing operation can correspond to a filtering operation, a ranking operation, and so on, or any combination thereof.

Figure 12:
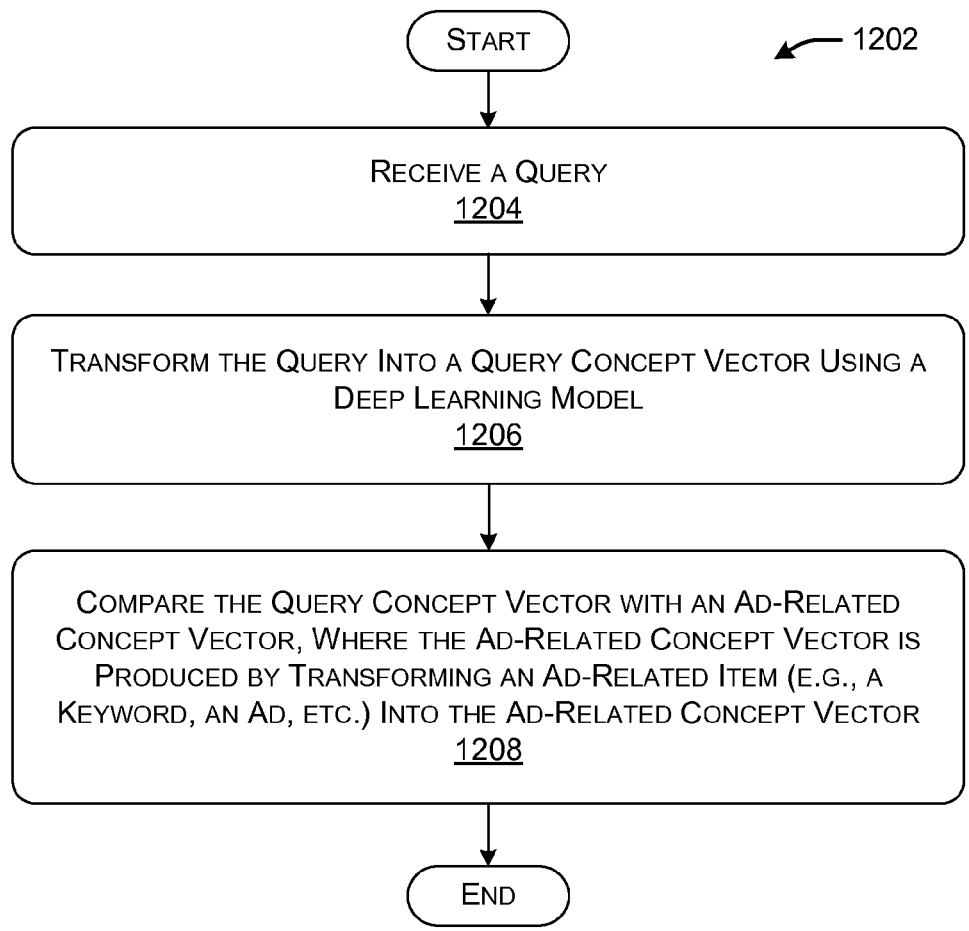
FIG. 12 is a flowchart that shows one manner of operation of the analysis engine, as applied within an ad-related environment.

FIG. 12 shows a procedure 1202 which represent an application of the procedure 1102 to an advertising-related domain. In block 1204, the similarity determination system 112 receives a query. In block 1206, the similarity determination system 112 transforms the query into a query concept vector using a deep learning model, such as a convolutional neural network. In block 1208, the similarity determination system 112 compares the query concept vector with an ad-related concept vector, to produce a similarity measure. The ad-related concept vector can be computed in online fashion (after the query is received) or in offline fashion (prior to the receipt of the query). The ad-related concept vector represents the projection of an ad keyword or an ad itself into a high-level semantic space.

Figure 13:
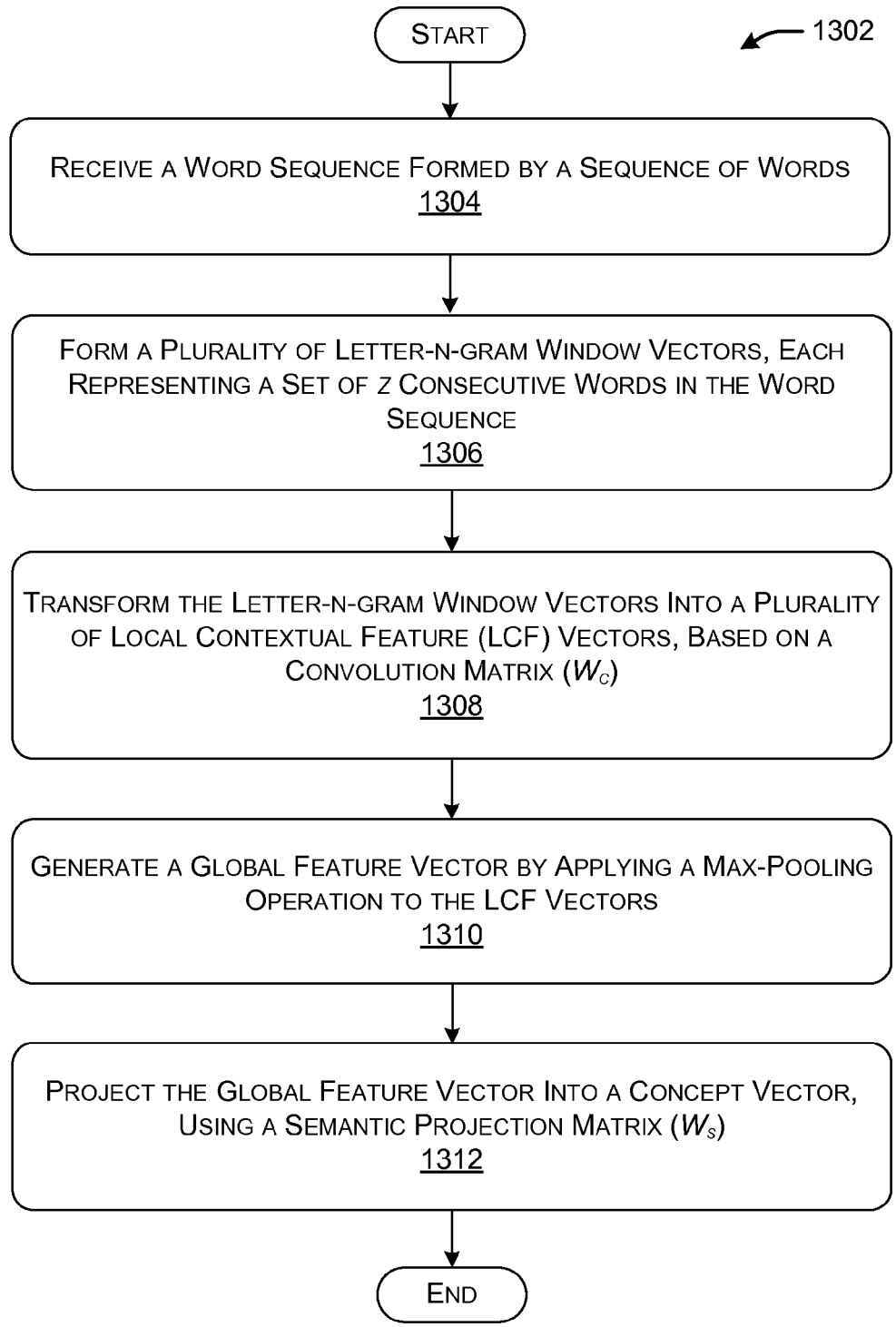
FIG. 13 is a flowchart that shows one manner of operation of an individual semantic transformation module, used by the similarity determination system.

FIG. 13 shows a procedure 1302 that represents one manner of operation of any individual semantic transformation module, such as the first semantic transformation module 304 of FIG. 3. In block 1304, the semantic transformation module 304 receives a word sequence that is formed by a sequence of words. In block 1306, the semantic transformation module 304 forms a plurality of letter-n-gram window vectors, each representing a set of z consecutive words in the word sequence. For example, block 1306 may be performed by first generating letter-trigram word vectors for the words in the word sequence, and then forming letter-trigram window vectors by concatenating 3-word groupings of the letter-trigram word vectors.

In block 1308, the semantic transformation module 304 transforms the letter-n-gram window vectors into a plurality of local contextual feature (LCF) vectors, using the convolution matrix $W_c$. In block 1310, the semantic transformation module 304 generates a global feature vector v by applying a max-pooling operation to the LCF vectors. And in block 1312, the semantic transformation module 304 projects the global feature vector v into a concept vector y using the semantic projection matrix $W_s$. The semantic transformation module 304 may perform block 1312 using a single-layer feed-forward neural network or a multi-layer feed-forward neural network.

C. Representative Computing Functionality

FIG. 14 shows computing functionality 1402 that can be used to implement any aspect of environment 102 of FIG. 1. For instance, the type of computing functionality 1402 shown in FIG. 14 can be used to implement any aspect of the training system 104 and/or any aspect of the analysis engine 110. In the context of FIG. 2, the computing functionality 1402 may be associated with the remote computing system 204 and/or any local computing device (206, 208, ... ). In all cases, the computing functionality 1402 represents one or more physical and tangible processing mechanisms.

The computing functionality 1402 can include one or more processing devices 1404, such as one or more central processing units (CPUs), and/or one or more graphical processing units (GPUs), and so on. In the context of FIG. 9, the GPUs can be particularly employed to facilitate the model-training process, which is a resource-intensive operation.

The computing functionality 1402 can also include any storage resources 1406 for storing any kind of information, such as code, settings, data, etc. Without limitation, for instance, the storage resources 1406 may include any of: RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removal component of the computing functionality 1402. The computing functionality 1402 may perform any of the functions described above when the processing devices 1404 carry out instructions stored in any storage resource or combination of storage resources.

As to terminology, any of the storage resources 1406, or any combination of the storage resources 1406, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 1402 also includes one or more drive mechanisms 1408 for interacting with any storage resource, such as a hard disk drive mechanism, an optical disk drive mechanism, and so on.

The computing functionality 1402 also includes an input/output module 1410 for receiving various inputs (via input devices 1412), and for providing various outputs (via output devices 1414). The input devices 1412 can include any of key entry devices, mouse entry devices, touch-enabled entry devices, voice entry devices, and so on. One particular output mechanism may include a presentation device 1416 and an associated graphical user interface (GUI) 1418. The computing functionality 1402 can also include one or more network interfaces 1420 for exchanging data with other devices via one or more networks 1422. One or more communication buses 1424 communicatively couple the above-described components together.

The network(s) 1422 can be implemented in any manner, e.g., by a local area network, a wide area network (e.g., the Internet), point-to-point connections, etc., or any combination thereof. The network(s) 1422 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1402 can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the functionality described above can employ various mechanisms to ensure the privacy of user data maintained by the functionality, in accordance with user expectations and applicable laws of relevant jurisdictions. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute a representation that others have appreciated and/or articulated the challenges or problems in the manner specified herein. Further, the claimed subject matter is not limited to implementations that solve any or all of the noted challenges/problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented by one or more computing devices, for processing linguistic items, comprising:
   receiving a word sequence formed by a sequence of words;
   forming a plurality of window vectors, each representing a set of z consecutive words in the word sequence;
   transforming the window vectors into a plurality of local contextual feature (LCF) vectors, based on a first part of a convolutional latent semantic model;
   generating a global feature vector by selecting, for each dimension of the LCF vectors, a maximum value specified by the LCF vectors, with respect to that dimension; and
   projecting the global feature vector into a concept vector, based on a second part of the convolutional latent semantic model, the convolutional latent semantic model being trained based on click-through data.

2. The method of claim 1, wherein the word sequence is associated with a first linguistic item, and wherein the concept vector comprises a first concept vector,
   and wherein the method further comprises:
   performing said forming, transforming, generating, and projecting with respect to at least a second linguistic item, to produce a second concept vector; and
   comparing the first concept vector with the second concept vector to generate a similarity measure.

3. The method of claim 2, wherein the first linguistic item corresponds to a query and the second linguistic item corresponds to a document.

4. The method of claim 2, wherein the first linguistic item corresponds to a query and the second linguistic item corresponds to a keyword associated with an advertising system.

5. The method of claim 2, wherein the first linguistic item corresponds to a query and the second linguistic item corresponds to an ad.

6. The method of claim 2, wherein the first linguistic item corresponds to one part of an ad and the second linguistic item correspond to another part of the same ad, and
wherein the similarity measure constitutes a quality measure that provides an indication of quality of the ad.

7. The method of claim 2,
further comprising ranking and/or filtering the first linguistic item and/or the second linguistic item based on a collection of features,
wherein the collection of features includes at least the similarity measure.

8. The method of claim 1, further comprising producing the plurality of window vectors by:
forming a plurality of word vectors, based on a letter-n-gram construction, that represent the words in the word sequence; and
concatenating groupings of the word vectors, each corresponding to z words, to form the window vectors, corresponding to letter-trigram window vectors.

9. The method of claim 1, wherein the convolutional latent semantic model is produced in a training process by maximizing a conditional likelihood of clicked documents, or keywords associated with clicked ads, given specified queries.

10. A device comprising:
a processor; and
executable instructions operable by the processor, the executable instructions comprising a method for processing linguistic items, the method comprising:
receives a word sequence formed by a sequence of words;
forming a plurality of window vectors, each representing a set of z consecutive words in the word sequence;
transforming the window vectors into a plurality of local contextual feature (LCF) vectors, based on a first part of a convolutional latent semantic model;
generating a global feature vector by selecting, for each dimension of the LCF vectors, a maximum value specified by the LCF vectors, with respect to that dimension; and
projecting the global feature vector into a concept vector, based on a second part of the convolutional latent semantic model, the convolutional latent semantic model being trained based on click-through data.

11. The device of claim 10, wherein the word sequence is associated with a first linguistic item and the concept vector comprises a first concept vector,
and wherein the method further comprises:
performing said forming, transforming, generating, and projecting with respect to at least a second linguistic item, to produce a second concept vector; and
comparing the first concept vector with the second concept vector to generate a similarity measure.

12. The device of claim 11, wherein the first linguistic item corresponds to a query and the second linguistic item corresponds to a document.

13. The device of claim 11, wherein the first linguistic item corresponds to a query and the second linguistic item corresponds to an ad.

14. The device of claim 11, wherein the method further comprises ranking the first linguistic item and the second linguistic item based on a collection of features.

15. The device of claim 10, wherein the method further comprises producing the plurality of window vectors by:
forming a plurality of word vectors, based on a letter-n-gram construction, that represent the words in the word sequence; and
concatenating groupings of the word vectors, each corresponding to z words, to form the window vectors, corresponding to letter-trigram window vectors.

16. An apparatus comprising:
a memory storing processor-executable instructions; and
a processor operatively coupled to the memory, wherein upon execution of the processor-executable instructions, the processor:
receives a word sequence formed by a sequence of words;
forms a plurality of window vectors, each representing a set of z consecutive words in the word sequence;
transforms the window vectors into a plurality of local contextual feature (LCF) vectors, based on a first part of a convolutional latent semantic model;
generates a global feature vector by selecting, for each dimension of the LCF vectors, a maximum value specified by the LCF vectors, with respect to that dimension; and
projects the global feature vector into a concept vector, based on a second part of the convolutional latent semantic model, the convolutional latent semantic model being trained based on click-through data.

17. The apparatus of claim 16, wherein the word sequence is associated with a first linguistic item and the concept vector comprises a first concept vector,
and wherein the processor further:
performs said forming, transforming, generating, and projecting with respect to at least a second linguistic item, to produce a second concept vector; and
compares the first concept vector with the second concept vector to generate a similarity measure.

18. The apparatus of claim 17, wherein the first linguistic item corresponds to a query and the second linguistic item corresponds to a keyword associated with an advertising system.

19. The apparatus of claim 17, wherein the first linguistic item corresponds to one part of an ad and the second linguistic item correspond to another part of the same ad, and
wherein the similarity measure constitutes a quality measure that provides an indication of quality of the ad.

20. The apparatus of claim 17, wherein the processor further filters the first linguistic item and the second linguistic item based on a collection of features.

* * * * *